United States Patent
Knight

(10) Patent No.: US 9,353,730 B2
(45) Date of Patent: May 31, 2016

(54) WIND ENERGY DEVICES, SYSTEMS, AND METHODS

(71) Applicant: Uprise Energy, LLC, San Diego, CA (US)

(72) Inventor: John R. Knight, San Diego, CA (US)

(73) Assignee: Uprise Energy, LLC, San Diego, CA (US)

(*) Notice: Subject to any disclaimer, the term of this patent is extended or adjusted under 35 U.S.C. 154(b) by 3 days.

(21) Appl. No.: 14/301,057

(22) Filed: Jun. 10, 2014

(65) Prior Publication Data

US 2014/0361540 A1 Dec. 11, 2014

Related U.S. Application Data

(60) Provisional application No. 61/833,195, filed on Jun. 10, 2013.

(51) Int. Cl.
*F03D 7/02* (2006.01)
*F03D 9/00* (2016.01)
*F03D 1/00* (2006.01)

(52) U.S. Cl.
CPC .............. *F03D 7/0276* (2013.01); *F03D 1/005* (2013.01); *F03D 7/022* (2013.01); *F03D 7/0272* (2013.01); *F03D 9/002* (2013.01); *F05B 2230/60* (2013.01); *F05B 2240/142* (2013.01); *F05B 2240/941* (2013.01); *F05B 2270/8042* (2013.01); *Y02E 10/723* (2013.01); *Y02E 10/725* (2013.01); *Y02P 70/523* (2015.11)

(58) Field of Classification Search
CPC ......................................................... F03D 1/06
USPC ............................................................. 290/44
See application file for complete search history.

(56) References Cited

U.S. PATENT DOCUMENTS

| | | | | |
|---|---|---|---|---|
| 2,152,576 | A * | 3/1939 | Weeks | 290/44 |
| 2,629,450 | A * | 2/1953 | Fumagalli | 416/133 |
| 5,183,383 | A | 2/1993 | Baas | |
| 6,320,272 | B1 * | 11/2001 | Lading et al. | 290/44 |
| 6,849,965 | B2 | 2/2005 | Le Nabour | |
| 7,432,610 | B2 * | 10/2008 | Wobben | 290/44 |
| 8,239,071 | B2 | 8/2012 | Lausen | |

(Continued)

FOREIGN PATENT DOCUMENTS

EP 2821635 A1 * 7/2015
WO WO 2013/071341 A1 5/2013

OTHER PUBLICATIONS

International Search Report and Written Opinion mailed Oct. 8, 2014 in International Application No. PCT/US2014/041733.

*Primary Examiner* — Joseph Waks
(74) *Attorney, Agent, or Firm* — Eric L. Lane; Green Patent Law

(57) ABSTRACT

Wind energy systems and devices include a nacelle, a rotor driven alternator housed in the nacelle, a rotor connected to the alternator, and a load control system in communication with the alternator. The rotor includes a rotor hub and three or more rotor blades, and each blade has a foil shape and is connected to the rotor hub by a full foil attachment mechanism. The alternator is configured to operate at low rpm and to increase rotation speed without a step-up mechanism. The load control system is configured to anticipate changes in wind speed and adjust alternator load such that when wind speed increases the load control system adjusts the alternator load to optimize rotor rpm and optimize tip-speed ratio.

20 Claims, 23 Drawing Sheets

(56) References Cited

U.S. PATENT DOCUMENTS

| | | |
|---|---|---|
| 8,277,167 B2 | 10/2012 | Shibata et al. |
| 2003/0071467 A1* | 4/2003 | Calley et al. .................... 290/44 |
| 2004/0041409 A1* | 3/2004 | Gabrys .......................... 290/55 |
| 2007/0248466 A1* | 10/2007 | Lotrionte ................... 416/223 R |
| 2008/0103611 A1* | 5/2008 | Altemark ....................... 700/34 |
| 2009/0311099 A1* | 12/2009 | Richards ...................... 416/120 |
| 2010/0060002 A1 | 3/2010 | Gabrys |
| 2010/0092291 A1* | 4/2010 | Scholte-Wassink .. F03D 7/0204 416/37 |
| 2010/0158687 A1* | 6/2010 | Dawson ................ F03D 7/0236 416/31 |
| 2010/0290912 A1* | 11/2010 | Sorensen ................... 416/204 R |
| 2011/0031760 A1* | 2/2011 | Lugg .............................. 290/55 |
| 2011/0148112 A1 | 6/2011 | Ormel et al. |
| 2012/0179376 A1* | 7/2012 | O'Brien ................ F03D 7/042 702/3 |
| 2013/0183161 A1* | 7/2013 | Richtman et al. ............. 416/232 |
| 2014/0091650 A1* | 4/2014 | Lenschow ....................... 310/54 |
| 2015/0247953 A1* | 9/2015 | O'Brien ................ G01W 1/10 702/3 |

\* cited by examiner

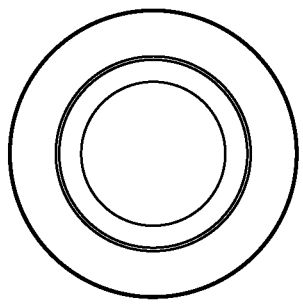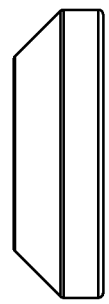
*FIG. 10A*  *FIG. 10B*
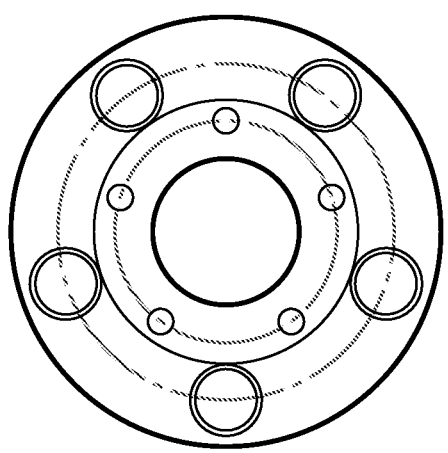
*FIG. 11A*  *FIG. 11B*

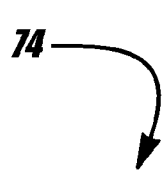
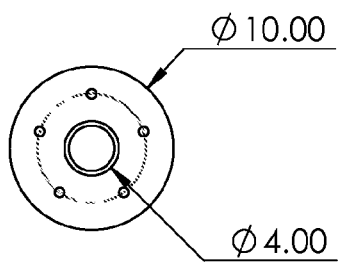
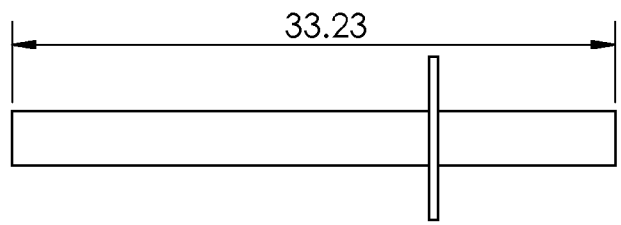
FIG. 13C  FIG. 13B
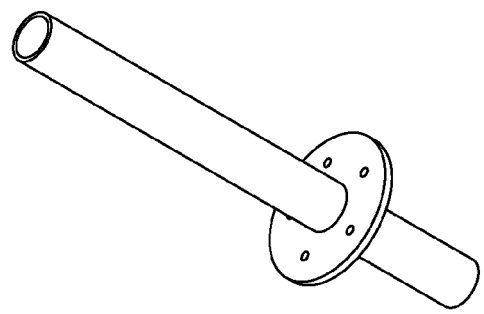
FIG. 13A

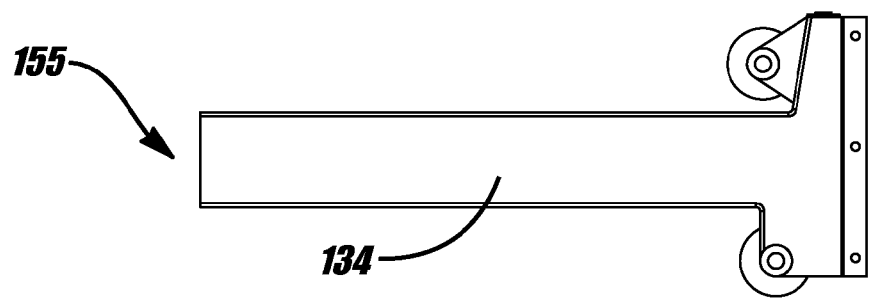
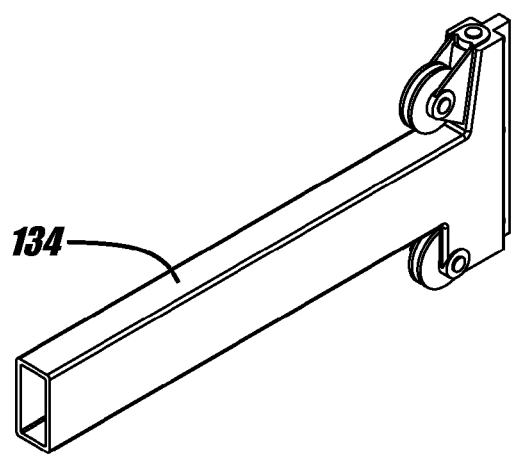
FIG. 20
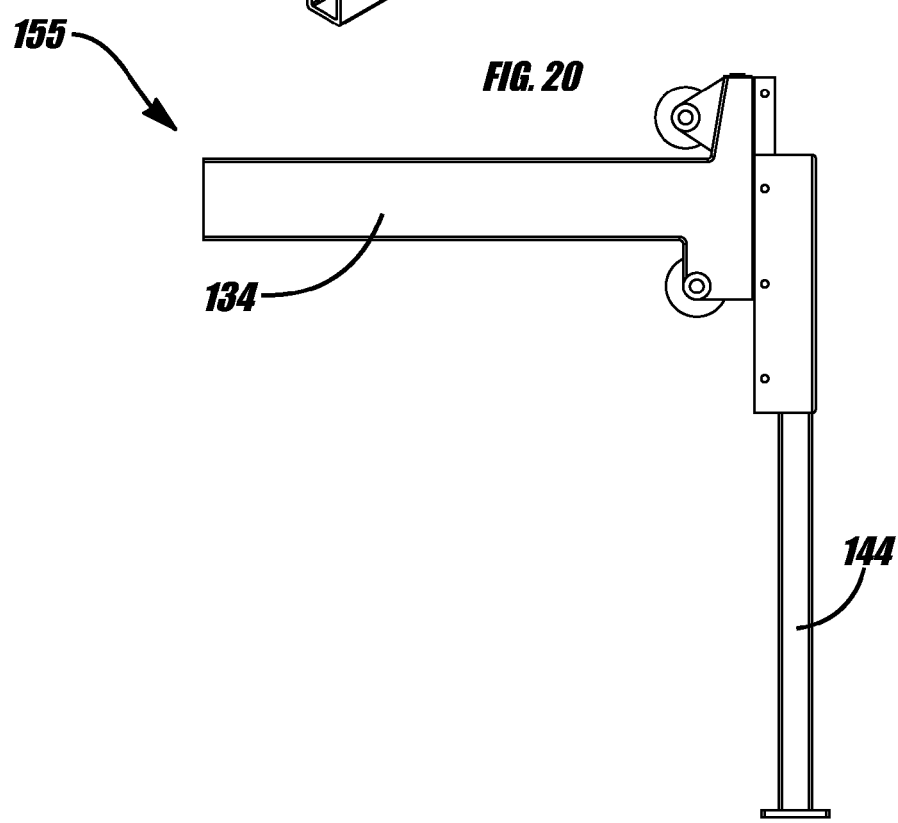
FIG. 21

WIND ENERGY DEVICES, SYSTEMS, AND METHODS

CROSS-REFERENCE TO RELATED APPLICATION

This application is a non-provisional of and claims priority to U.S. Patent Application Ser. No. 61/833,195, filed Jun. 10, 2013, which is expressly incorporated by reference herein in its entirety.

FIELD OF THE DISCLOSURE

The following disclosure relates to wind energy systems, devices, and methods.

BACKGROUND

Conventional wind turbines use established technology to extract energy from the wind. However, existing wind turbines are subject to a number of internal and external constraints, such as blades that are heavy, stiff, and fixed in pitch, high cut-in wind speeds, high parasitic losses, heavy and expensive components, and the need to stall blades to prevent overload. These drawbacks are particularly pronounced for development of small wind machines designed to operate at low wind speeds. At such speeds, conventional wind turbines generate very low power output and are not economically viable.

Meaningful output in light, variable winds is crucial to the economic viability of small wind machines. Providing such a viable option to communities in remote regions where there are few, if any, energy production options can expand opportunities for self-reliance and prosperity. Although electricity generation at low wind speeds may be low level output, it is still positive compared to no output at all. Thus, there is a need for a small wind energy system that can operate efficiently at low wind speeds.

Furthermore, wind gust energy is not captured in conventional wind energy systems. Most existing systems are not designed to react and quickly adjust to changes in wind direction and wind speed, i.e., wind gust changes, and therefore cannot match the direction and velocity of the wind currents. As a result, existing wind energy systems capture very little of the extra energy in wind gusts, and the gusts may cause excessive generator revolutions per minute (rpm), resulting in overloading and damage to the wind turbine. This is a significant missed opportunity. In a typical gusty wind environment, the energy in a wind gust can contain 150% more energy than the energy of the steady wind. Even small variations in wind speed can be significant for energy capture. This is because the amount of energy the wind contains is proportional to the cube of the wind speed so, for example, 12 mph wind has 73% more energy than 10 mph wind, doubling the wind speed results in eight times the power, and tripling the wind speed results in 27 times the power. Thus, there is a need for a wind energy system that can harness the energy in wind gusts.

A wind turbine blade generates its maximum lift, or power, when the blade has the correct foil shape and angle of attack for a given wind speed. However, most conventional blades are not optimized for maximum lift. As wind speed changes with gusts, turbine blade rpm changes with wind speed and the tip speed changes from root to tip. The tip speed and root speed can be very different. Maintaining constant pitch over these large speed differentials requires enormous twist. The angle of attack is correct for only one wind speed and rotor rpm, and pitch control does not maintain the correct angle of attack over the entire blade with wind speed changes. In other words, the variables of foil shape and angle of attack become ever more difficult to optimize. Thus, there is a need for an optimized blade shape to generate maximum lift during wind gusts.

Another disadvantage of existing wind turbine technology is the need for transmissions to increase rotor rpm to acceptable generator rpm. Many newer systems use large diameter generators with large numbers of field coils and/or permanent magnets. However, these systems do not allow the electricity to be connected to the 60-Hertz utility grid without the use of transformers and static inverters. Utility scale generators use speed-regulating governors to spin the generator at grid frequency. Conventional wind turbines cannot regulate the speed of the rotor, which drives the generator directly, and as a result, require the use of expensive, heavy, inefficient transformers and inverters to condition the power so it is acceptable for grid-tie. Thus, there is a need for a wind energy system that obviates the need for the transmission, transformer, and static inverter to reduce parasitic losses, reduce tower weight, and reduce related costs and costs associated with shipping and maintenance while spinning the generator at precise grid frequency.

Conventional wind energy systems cannot produce power everywhere it is needed because they are difficult to transport and install. This is because they are too large and/or heavy to transport to remote areas and require highly skilled technicians for installation. Many remote areas are not connected to a utility grid, such as indigenous communities, disaster relief areas, and military operation zones. There is a need for a portable wind energy system that can be easily transported to and installed in remote regions not connected to a power grid, and/or by consumers who want to use renewable energy, reduce and stabilize electric costs. In particular, there is a need for a portable, hydraulically self-erecting wind energy system that does not need cranes for deployment, does not require specialized skills to erect, needs minimal assembly, eliminates slab, and eliminates the need for transmission lines.

Accordingly, there is a need for a wind energy system that can operate efficiently at low wind speeds. There is also a need for a wind energy system that can effectively harness energy from wind gusts. There is a need for a wind energy system with turbine blades designed to generate maximum lift during wind gusts. There is a further need for a wind energy system that eliminates the transmission, transformer, and static inverter to reduce parasitic losses and costs associated with those components. Finally, there is a need for a portable wind energy system that can be easily transported to and installed in remote regions. In sum, there is a need for a small wind energy system that is easily transportable and installable and is economically viable at low wind speeds and in wind gusts.

SUMMARY

The present disclosure, in its many embodiments, alleviates to a great extent the disadvantages of known wind energy systems by providing a wind energy system with a number of innovative designs and features that greatly improve energy production in low and gusty winds. Embodiments of the disclosure advantageously react and adjust to wind gusts and therefore the output potential is double most conventional wind turbines operating in similar environments. Disclosed devices, systems and methods provide optimal rotor and blade design where each blade has a foil shape that extends substantially the entire length the blade and is connected to the rotor hub by a full foil attachment mechanism. Disclosed devices, systems and methods advantageously include an alternator configured to operate at low rpm and to increase rotation speed without a step-up mechanism. Furthermore, disclosed devices, systems and methods advantageously include a load control system that adjusts alternator load and hub pitch to increase rotor rpm and optimize tip-speed ratio.

Exemplary embodiments of a wind energy system comprise a nacelle, a rotor driven alternator housed in the nacelle, a rotor connected to the alternator, and a load control system in communication with the alternator. The rotor includes a rotor hub and three or more rotor blades. In exemplary embodiments, the wind energy system comprises five rotor blades. Each blade is connected to the rotor hub. Each rotor blade may have a foil shape and be connected to the rotor hub by a full foil attachment mechanism. The load control system is configured to anticipate changes in wind speed and adjust alternator load such that when wind speed increases the load control system adjusts the alternator load to optimize rotor rpm and optimize tip-speed ratio. The alternator may be configured to operate at low rpm and to increase rotation speed without a step-up mechanism. In exemplary embodiments, the load control system adjusts the alternator load by reducing magnetic field strength of the alternator.

In exemplary embodiments, the load control system includes an overload protection system configured to anticipate and monitor for overload conditions. In exemplary embodiments, when the overload protection system detects an overload condition, the overload protection system manages alternator excitation, rotor rpm, rotor pitch, rotor azimuth, and/or lay down. The overload protection system may manage alternator excitation, rotor rpm, and/or rotor pitch, rotor azimuth, and/or lay down by negating power. The wind energy system may further comprise a mast, and the nacelle may be mounted to the mast. In exemplary embodiments, an anemometer is in communication with the load control system.

Exemplary embodiments of a wind energy system comprise a nacelle, a rotor driven alternator housed in the nacelle, a rotor connected to the alternator, and a load control system in communication with the alternator. The rotor includes a rotor hub and three or more rotor blades. Each blade is connected to the rotor hub. The load control system is configured to anticipate changes in wind speed and adjust alternator load. The alternator is configured to operate at low rpm and to increase rotation speed without a step-up mechanism. In exemplary embodiments, the alternator includes one or more field coils. The alternator may include between about 40-50 poles, and in exemplary embodiments includes 48 poles. The alternator may be configured to operate at about 50-160 rpm. In exemplary embodiments, the alternator defines an air gap of about $10/1000$ inches. In exemplary embodiments, the alternator includes a hollow central tube.

An exemplary embodiment of a wind energy system comprises a nacelle, a rotor driven alternator housed in the nacelle, a rotor connected to the alternator, and a load control system in communication with the alternator. The rotor includes a rotor hub and three or more rotor blades. In exemplary embodiments, the rotor has five blades. Each blade is connected to the rotor hub. The load control system is configured to anticipate changes in wind speed and adjust alternator load. Each rotor blade has a foil shape and is connected to the rotor hub by a full foil attachment mechanism. In exemplary embodiments, the full foil attachment mechanism is a slipper fitting defining a shape corresponding to the foil shape of each blade. The foil shape may extend substantially the entire length of each blade.

The lift and drag of a blade is highly dependent upon the leading edge angle of attack. Exemplary embodiments utilize one or more methodologies to optimize the angle of attack. The pitch control hub rotates the blades to control the pitch in the lower portion of the blade. As the rpm increases, the angle of attack of the tip reduces more at the tip than at the root. To accomplish this, the blade may incorporate sweep and twist technology in the blade design and construction. This will allow the load at the tip to increase twist and dynamically improve the angle of attack.

In exemplary embodiments, a portable wind machine is provided comprising a pivotable trunnion, a mast partially disposed in the trunnion, a nacelle mounted to the upper section of the mast, a rotor driven alternator housed in the nacelle, a rotor connected to the alternator, and a load control system in communication with the alternator. The rotor includes a rotor hub and three or more rotor blades. In exemplary embodiments, the rotor has five blades. Each blade is connected to the rotor hub. The alternator is configured to increase rotation speed without a step-up mechanism. Each rotor blade is connected to the rotor hub by a full foil attachment mechanism. The full foil attachment mechanism may be a slipper fitting defining a shape corresponding to a foil shape of each blade.

The mast is comprised of a base section disposed in the trunnion, a lower section slidably disposed in the base section, and an upper section slidably disposed in the lower section. The mast is rotatable between a horizontal, retracted position centered in the trunnion and a vertical position and may include a quadrant gear and worm gear. The mast may include a rotating collar attached to the upper section of the mast allowing rotation of the mast. The mast may further comprise guy wires attached to the collar. A custom trolley may be provided to position the nacelle, hub, drive, shaft, and alternator, and to connect to the mast extension in a horizontal position.

In exemplary embodiments, the load control system is configured to anticipate changes in wind speed and adjust alternator load such that when wind speed increases the load control system adjusts the alternator load to optimize rotor rpm and optimize tip-speed ratio. The wind machine may further comprise an overload protection system configured to and anticipate and monitor for overload conditions.

Exemplary methods of generating energy from wind comprise providing a nacelle and housing a rotor driven alternator in the nacelle, connecting a rotor having a rotor hub to the alternator, and connecting three or more rotor blades to the rotor hub, controlling load on the alternator, and monitoring for overload conditions. Load on the alternator may be controlled by anticipating changes in wind speed and adjusting alternator load when wind speed increases. Exemplary methods may further include managing alternator excitation, rotor rpm, rotor pitch, rotor azimuth, and/or lay down when an overload condition is identified.

In exemplary methods, adjusting alternator load comprises reducing magnetic field strength of the alternator. Managing alternator excitation, rotor rpm, rotor pitch, rotor azimuth, and/or lay down may comprise negating power. Exemplary methods further comprise mounting the nacelle to a mast and lowering the mast into a horizontal position when an overload condition is identified. Exemplary methods further comprise receiving signals from an anemometer. Exemplary methods further comprise turning the mast, rotor hub and blades to face a different direction.

In exemplary embodiments, a procedure to effectively capture and distribute wind gust energy includes the following steps. A laser anemometer predicts the speed, direction, and duration of an oncoming wind gust. The load control system, enabled by smart computer programming, analyzes the gust, and if worthwhile, instructs the yaw motor to turn the rotor into the oncoming wind. The load control system adjusts the load on the alternator or generator through external excitation to apply a load equal to the available power, thus preventing a rotor lug condition. The rotor may be allowed to spin to a higher rpm to match the optimum tip-speed ratio of the oncoming wind gust. Blade pitch may also be adjusted to optimize angle of attack. As the gust load is absorbed, the load control system increases excitation and the alternator or generator load will increase accordingly. In embodiments utilizing a hydrostatic transmission, through load, rpm, and speed sensors, the hydrostatic transmission automatically adjusts system pressure and volume to maintain generator rpm to carry the load. Should weather conditions pose an overload threat, the wind energy system can park and lay itself down to protect itself from storm conditions. Thus, predictive management, fuzzy logic, DWTW optimizes fluky variable wind conditions and wind gusts.

In exemplary embodiments, trailer assemblies for transporting wind machines are provided. An exemplary trailer assembly comprises a central carousel, a mast, a yaw control, and a plurality of deployable outriggers. The carousel supports the mast and yaw control. The outriggers may include ground pads and screw jacks that provide a level and stable platform for the wind machine. The carousel may also include a pivotable trunnion, a housing for the generator, a retractable grounding stake, a slip ring for delivering electricity to an output cable, a yaw gear and yaw motor drive system, and a central shaft and bearings to support the trunnion and mast of the wind machine and allow rotation. The trailer assembly may further comprise a command center control station or power management console.

Thus, an exemplary wind energy system can be shipped in a single 40-foot shipping container and upon arrival at the shipping port can be towed to its use site on unimproved roads with a standard medium duty vehicle. Once on site at the desired operational location, outriggers are deployed from the trailer, blades are snapped into place, the tower or mast is hydraulically raised, and guy wires are anchored. Within a very short period of time, even just a couple of hours, 1-2 workers with average skills can have the wind energy system assembled, deployed, and generating power. If conditions warrant a relocation of the wind energy system, it can be moved with the same relative ease. The portability and ease of transport to distributed generation sites eliminates some or all of the expenses associated with wind study, land acquisition, permitting, siting, site preparation, transportation, erection, environmental compliance, transmission lines, and O&M.

The devices, systems, and methods of the disclosure advantageously provide small wind machines in the 10-100 kW range that are economically viable and can produce power in remote or off-grid areas where it is needed. These wind machines fulfill the need for meaningful, portable, renewable energy systems and mitigate or eliminate the above-mentioned constraints that prevent conventional wind turbines from achieving optimal efficiency. For instance, disclosed devices, systems, and methods improve low wind speed energy capture and improve wind gust energy capture.

Moreover, disclosed devices, systems, and methods, while eliminating the constraints mentioned above, provide the benefits of utilizing a laser anemometer to predict wind direction and velocity, computer management of wind power, rpm, and load, low weight and low inertia in the rotor and blades, reducing weight aloft, utilizing a hydrostatic variable speed transmission, utilizing a synchronous generator, stabilizing power output, portability, storing energy in hydrogen and/or batteries, and producing water from air.

Additional objects of the present disclosure are to increase steady wind turbine energy capture from an industry average of about 25% to about 50%, improve wind gust energy capture by multiples proportional to the increases in wind velocity, reduce the cost of a 10-100 kW wind machine by as much as 50% compared to existing small wind machines, reduce lifespan costs to ten cents per kWh, thereby reducing costs to less than domestic utility rates, deliver power directly to consumer without the need for transmission lines. Disclosed devices, systems, and methods maximize energy capture and achieve optimum efficiency. They are therefore economically viable, convenient, and overcome the constraints that hinder conventional turbines.

Additional objects of the present disclosure are to feed generator output directly into the power grid without use of a gearbox, transformers, or inverters, provide a wind machine that fits into a standard shipping container and can be towed by a medium duty vehicle, eliminate the need for cranes and specialized technicians at site setup, and reduce O&M costs through service at the ground level.

Additional objects of the present disclosure are to minimize the potential of the wind energy system being damaged by strong winds. This is accomplished through multiple safety features. These include rpm control through VFD control and dynamic electrical braking and total wind force reduction through control of the rudder to yaw the blades away from the wind's direct force. These further include programmable auto stop with a disc brake designed to fail safe and programmable auto lay-down feature, either partial to dump wind force or full lay-down. These further include a two-piece hub design to allow simple error-free installation of each blade and then apply uniform clamp pressure to grip the blades in perfect indexing and alignment. These further include a winglet to reduce vortex losses, a nylon veil on the blade surface to eliminate UV degradation, pitting, and surface fouling, and/or a tough polypropylene resin.

BRIEF DESCRIPTION OF THE DRAWINGS

The above-mentioned features and objects of the present disclosure will become more apparent with reference to the following description taken in conjunction with the accompanying drawings wherein like reference numerals denote like elements and in which:

FIG. 10A is front view of an exemplary embodiment of a thrust washer in accordance with the present disclosure;

FIG. 10B is a side view of the thrust washer of FIG. 10A;

FIG. 11A is a front view of an exemplary embodiment of a retaining washer in accordance with the present disclosure;

FIG. 11B is a side view of the retaining washer of FIG. 11A;

FIG. 13A is a perspective view of an exemplary embodiment of a drive shaft in accordance with the present disclosure;

FIG. 13B is a cross-sectional view of the drive shaft of FIG. 13A;

FIG. 13C is a side view of the drive shaft of FIG. 13A;

FIG. 20 includes various views of an exemplary embodiment of a self-aligning pulley and jack system in accordance with the present disclosure;

FIG. 21 is a side view of an exemplary embodiment of a self-aligning cable sheave and adjustable jack in accordance with the present disclosure;

DETAILED DESCRIPTION

In the following detailed description of embodiments of the disclosure, reference is made to the accompanying drawings in which like references indicate similar elements, and in which is shown by way of illustration specific embodiments in which disclosed systems and devices may be practiced. These embodiments are described in sufficient detail to enable those skilled in the art to practice the embodiments, and it is to be understood that other embodiments may be utilized and that logical, mechanical, functional, and other changes may be made without departing from the scope of the present disclosure. The following detailed description is, therefore, not to be taken in a limiting sense, and the scope of the present disclosure is defined only by the appended claims. As used in the present disclosure, the term "or" shall be understood to be defined as a logical disjunction and shall not indicate an exclusive disjunction.

Figure 1:
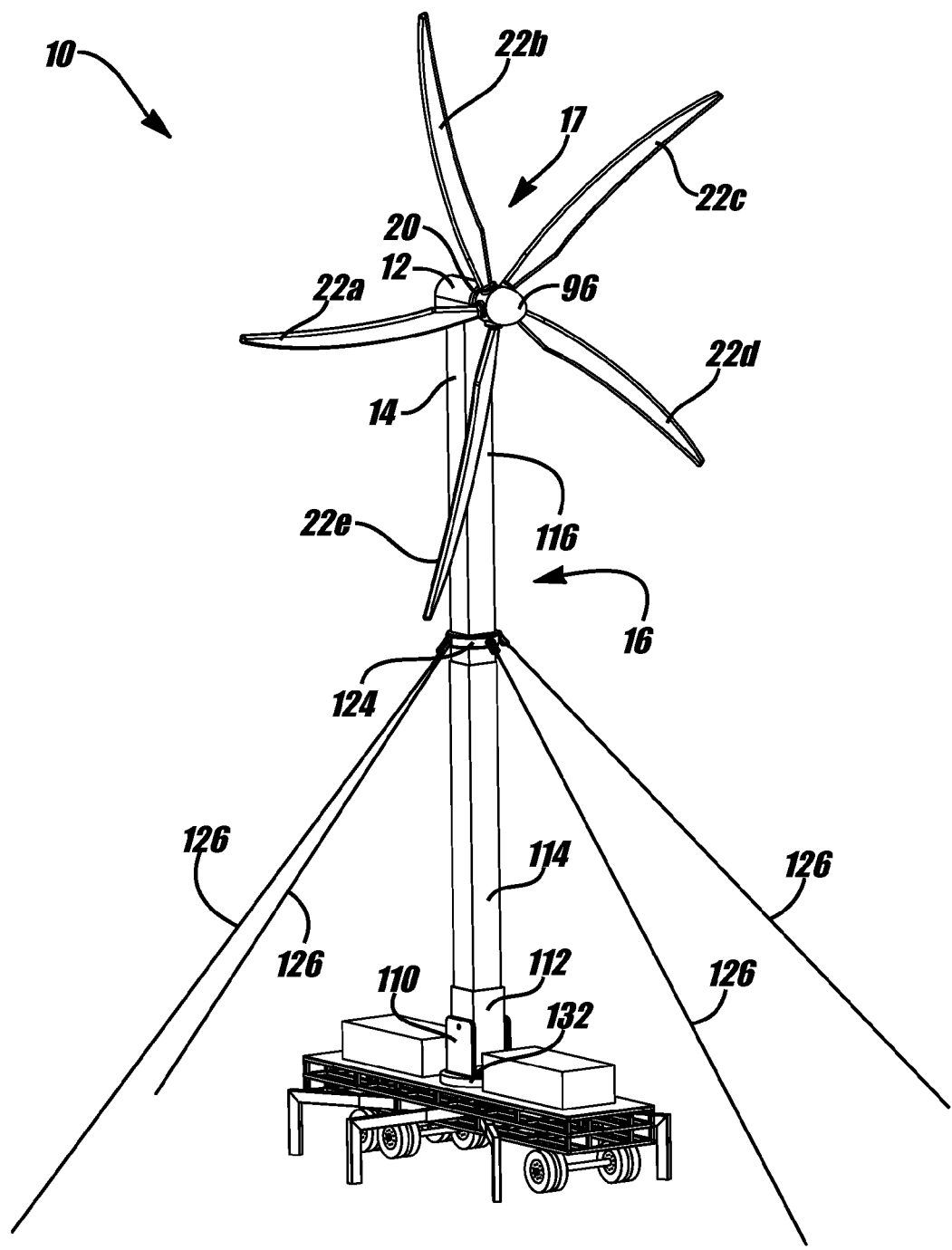
FIG. 1 is a perspective view of an exemplary embodiment of a wind energy system in accordance with the present disclosure.
Figure 2:
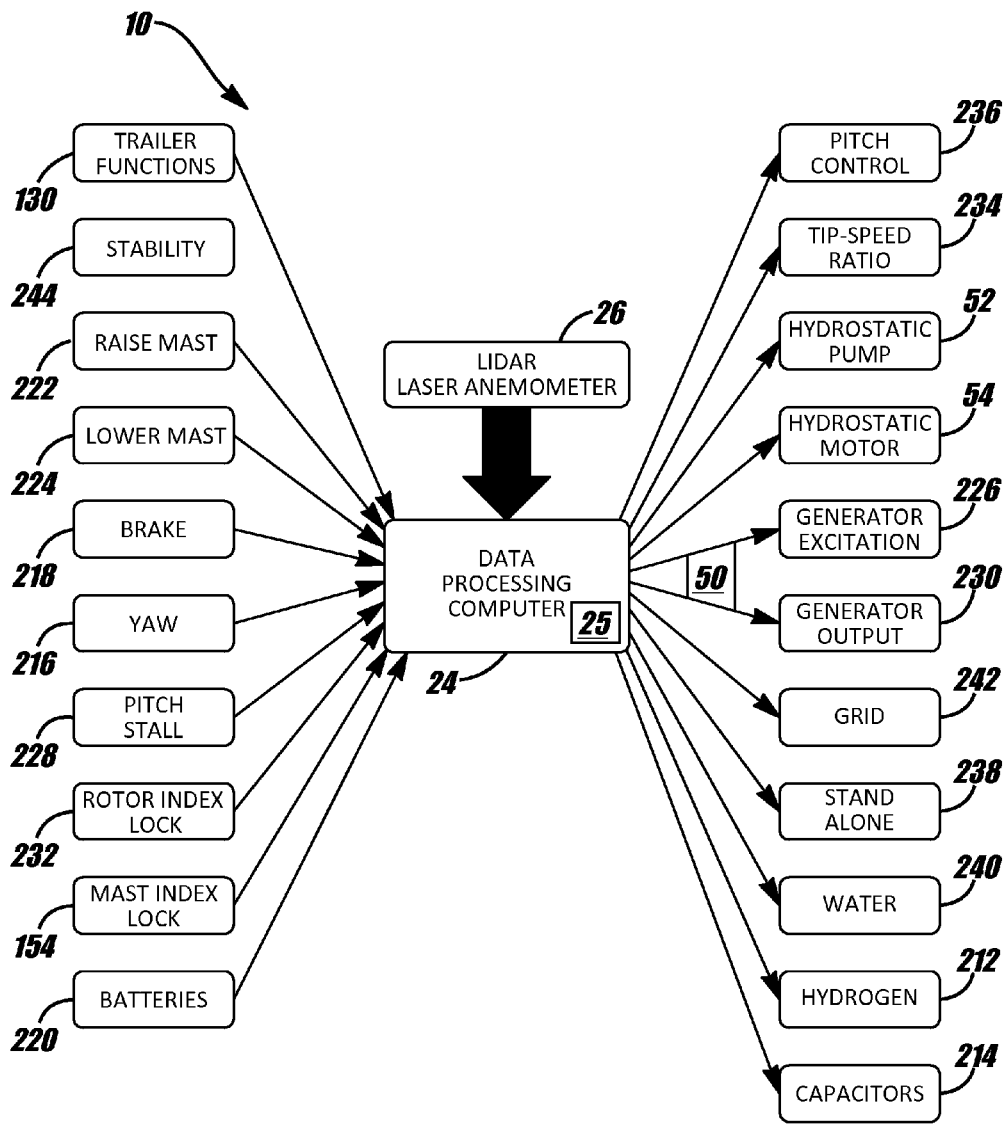
FIG. 2 is a schematic diagram of an exemplary embodiment of a wind energy system and load control system in accordance with the present disclosure.
Figure 27:
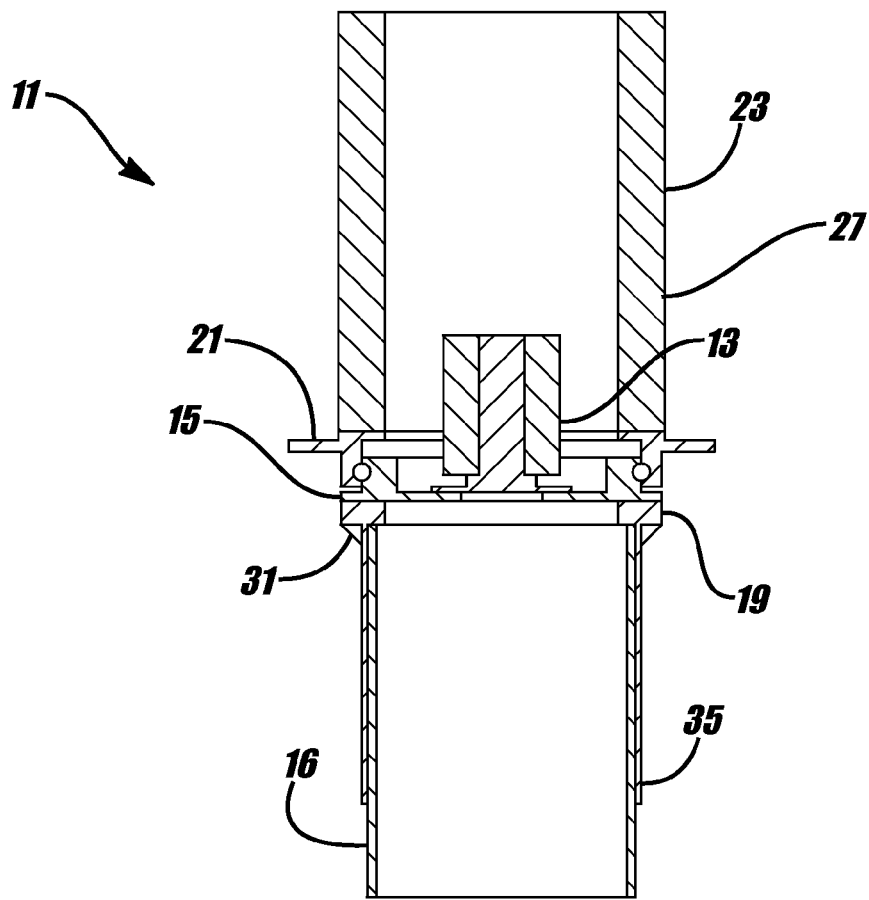
FIG. 27 is a cross-sectional view of an exemplary embodiment of a nacelle rotation assembly and slip rings in accordance with the present disclosure.

FIGS. 1-2 show an exemplary embodiment of a wind energy system. Wind energy system 10 comprises a nacelle 12 mounted to the top portion 14 of a mast 16. The nacelle 12 houses various components of the wind energy system 10, including alternator 18. Nacelle 12 is a strong structure, which may be made of steel or other material of suitable strength, and supports the rotor shaft and bearings and rotates with the mast 16. As best seen in FIG. 27, a rotation assembly 11 including a slip ring assembly 13 may be provided in the nacelle 12 to allow the lower mast to remain fixed and allow the nacelle to rotate without concern for electrical cable wind-up. In exemplary embodiments, 16 slip rings connect the power output cable, the brake and rudder power cable, and the signal wires for the anemometer, rpm, mast lights, uplink-downlink, and auxiliary loads. An adapter slip mount 15 and mounting ring bearing 19 may be provided to mount slip ring assembly 13 to the mast 16. A brake disk 21 may also be provided to stop rotation to prevent damage to the wind energy system, as described in more detail herein. In exemplary embodiments, additional structural components are provided such as a strut nacelle mounting 23, a mounting sleeve 35, a gusset 31, a slewing bearing 27, and a cross tube 29 for the index pin.

In exemplary embodiments, a weatherproof housing covers the shaft and bearings and other components. The wind energy system 10 includes a rotor 17 or 2217, comprised of the rotor hub 20 or 2220 and the rotor blades 22 or 2222, which converts the kinetic energy in the wind to mechanical energy. As discussed in more detail herein, alternator 18 generates electrical power from the wind energy. Rotor hub 20 is connected to the alternator 18 and provides mounting for the rotor blades 22 or 2222. Exemplary embodiments comprise three, four, or five blades 22a-22e mounted to the rotor hub 20. The wind energy system includes a load control system 24 to manage the load on the wind energy system 10. Load control system 24 is in communication with multiple components including the alternator 18 and rotor hub 20 and may be connected to and programmed using a graphical user interface 37. An anemometer 26 or similar LIDAR device may also be mounted to the rotor 17 or mast 16 to determine wind speed, direction, and energy level. A variable frequency drive (VFD) may be incorporated and programmed to regulate the load on the alternator in accordance with the tip-speed ratio required to optimize blade capture efficiency. Flux density, air gap, permeability, reluctance, and rotor velocity are optimized to minimize electrical losses.

Figure 29:
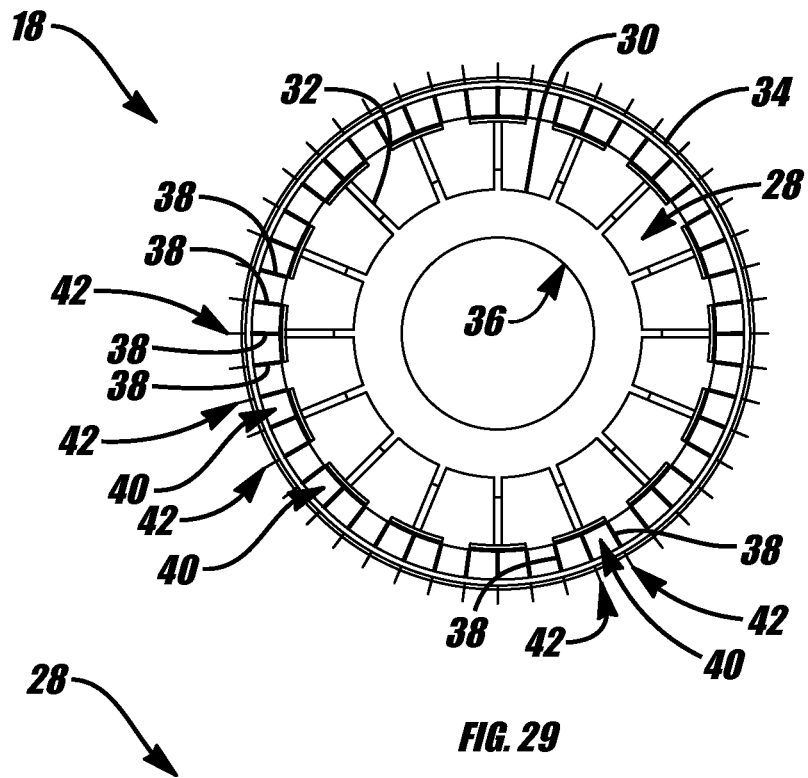
FIG. 29 is a side view of an exemplary embodiment of an alternator in accordance with the present disclosure.
Figure 31:
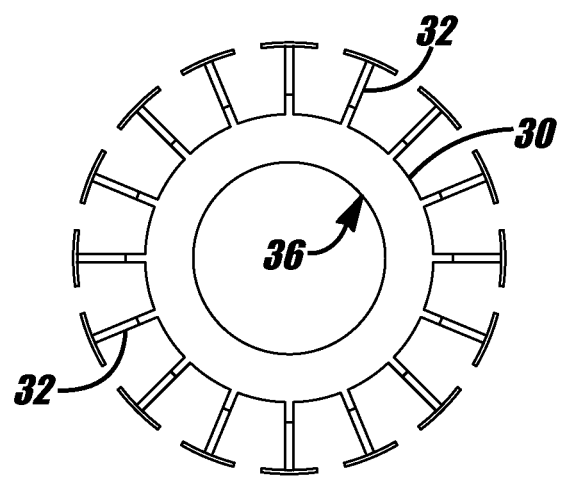
FIG. 31 is a side view of an exemplary embodiment of a rotor in accordance with the present disclosure.
Figure 30:
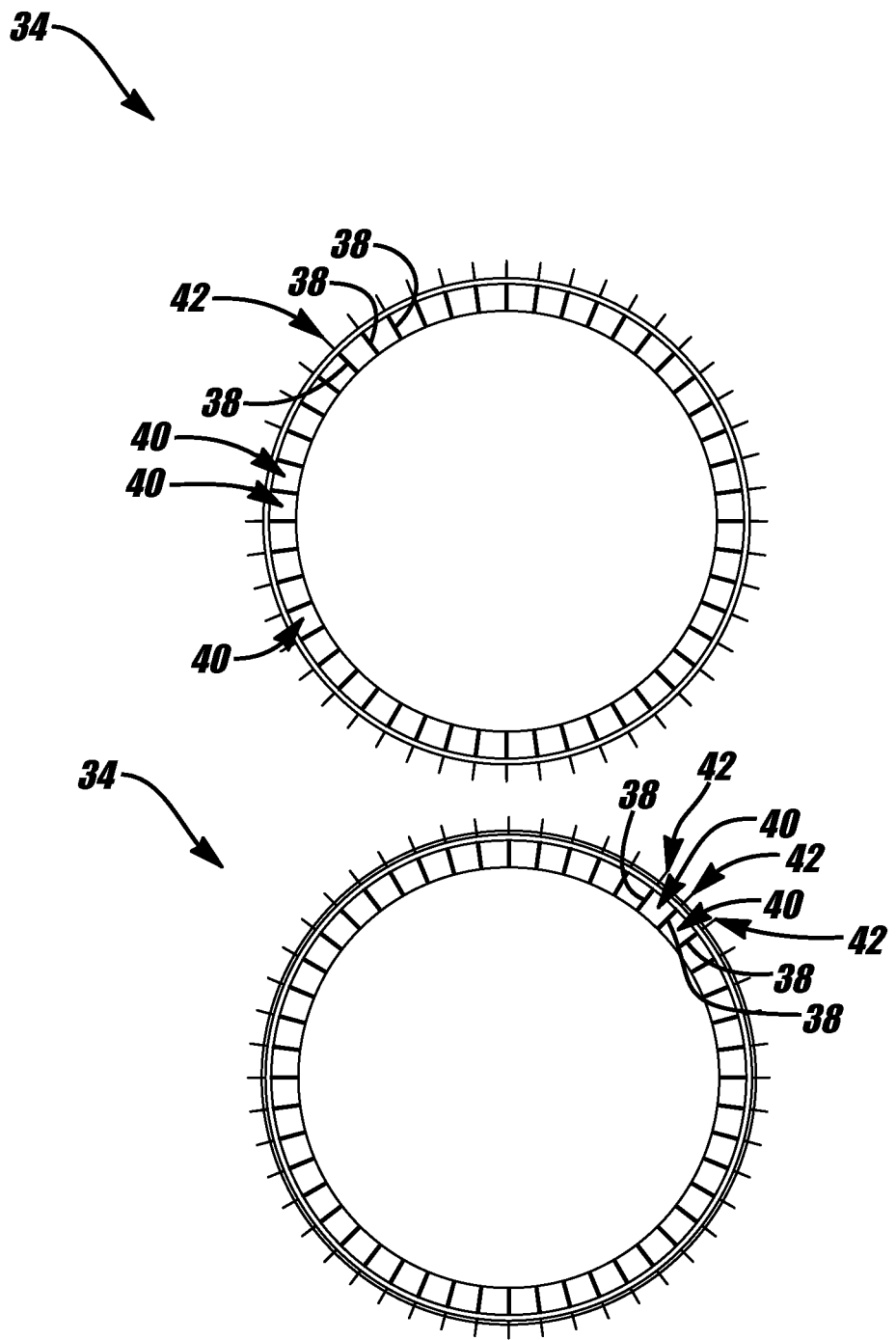
FIG. 30 is a side view of an exemplary embodiment of a stator in accordance with the present disclosure.

Referring to FIGS. 29-31, an exemplary embodiment of an alternator will now be described. Alternator 18 uses a rotating magnetic field to convert the mechanical energy of the rotor 17 to electrical or other forms of energy. In exemplary embodiments, the alternator is a large diameter low speed, multi-pole, poly-phase alternator regulated to match the power curve of the kW rotor. Alternator 18 may include an enclosure or housing and a rotating magnet, or rotor 28 housed therein; the rotor has a diameter in the range of 20-30 inches. In an exemplary embodiment, the diameter of the alternator rotor 28 is 27 inches. Alternator rotor 28 comprises an alternator hub 30 and a plurality of vanes 32 attached to the hub 30 and extending from the hub 30 to an outer ring 34 or stator. A central tube 36, made of aluminum or other suitable material, may be hollow to reduce the weight of the alternator 18. This and other weight reduction features disclosed herein allow the wind energy system to be nimbler because lower weight reduces inertia, which allows the rotor to change rpm rapidly and react to wind gusts.

The outer ring 34 of the alternator 18 has a number of field coils 38 within the poles, which are separated by an air gap 40. The air gap may be $^{10}/_{1000}$ to $^{30}/_{1000}$, and in exemplary embodiments is about $^{10}/_{1000}$ inches. The field coils 38 are advantageously arranged such that the alternator 18 incorporates a very high number of poles so it can rotate at a speed suitable for direct drive capability. In exemplary embodiments, alternator 18 incorporates 36-72 magnetic poles 42. An exemplary embodiment of alternator 18 incorporates 48 poles 42. The vanes 32 are rotated by air entering the alternator 18 and moving laterally across the vanes 32, thereby rotating the alternator rotor 28 and inducing a current in the field coils 38. In exemplary embodiments, alternator 18 includes high permeability laminations, which may be made of iron or other suitable material, to improve the efficiency of the wind energy system.

Advantageously, the design of alternator 18 enables the wind energy system 10 to operate at very low rpm and to increase rotation speed without the need for any step-up mechanism, such as a step-up gearbox. It also effectively eliminates parasitic losses and reduces excitation values. Furthermore, it eliminates startup "cogging loads" found in conventional alternators that use permanent magnets and therefore require significant force to overcome magnetic attraction known as "cogging." Thus, the alternator rotates freely at very low wind speeds. The VFD can reduce cogging loads to zero, thus enabling the rotor to spin in wind speeds as low as about 1 mph. In exemplary embodiments, the VFD converts any alternator output into the correct voltage, either any DC voltage to charge the batteries (16 batteries, in exemplary embodiments), or any AC voltage at 50 or 60 hertz. Total wattage may depend on wind speed and alternator efficiency, which, due to custom design and regulation by the VFD, can be above 90% throughout the rpm range.

The normal operating rpm of the alternator 18 is about 50 to about 160, but lower and higher rpm are possible. In addition, alternator 18 obviates the need for the transmission, transformer, and static inverter to reduce parasitic losses, reduce tower weight, and reduce related costs and costs associated with shipping and maintenance. As discussed in more detail herein, the wind energy system provides external excitation of the rotating field coils 38 through field and stator regulation to vary the magnetic flux and control voltage, torque, and ultimately control rotor rpm and optimize blade capture efficiency through load control. By regulating the field strength to control the voltage and torque, rpm is managed to meet precise tip-speed ratio to the speed of the incoming wind.

Exemplary embodiments of a wind energy system could employ a hydraulic, or hydrostatic, drive system. Such embodiments comprise an off-the-shelf generator 50 instead of the alternator described above, a hydraulic pump 52, and a drive motor 54. More particularly, the drive motor 52 is an off-the-shelf axial-piston hydrostatic transmission that delivers rotor power to the generator 50, which may be a 50 kW model. The axial piston hydraulic pump may include a load sensing feature that momentarily unloads when a signal from the anemometer indicates a wind gust. The generator may also unload momentarily so as not to lug, which allows the rotor to increase in rpm, thus maintaining an improved angle of attack. The transmission uses a speed-regulating governor that allows the rotor to spin at any rpm to maintain optimum tip-speed ratio with the wind while at the same time spinning the generator at a constant rpm to enable direct grid-tie at grid frequency. Advantageously, the hydrostatic drive system maintains regulated optimum rpm at precise grid frequency, thereby allowing the generator 50 to deliver power to the grid through conventional paralleling equipment without the need for a transformer or an inverter. In addition, the use of an off-the-shelf generator eliminates the need for expensive rare earth magnets.

Although the hydrostatic system may have an overall system loss of about 9%, the parasitic losses of the equipment the generator replaces—the gearbox (about 5% loss), the transformer (about 2% loss), and inverter (about 2% loss)—are about equal to that loss. In addition, while a synchronous generator may operate at 3-5% loss, an induction generator operating above or below grid speed can operate at a higher efficiency (up to about 16%) and may produce a lagging or leading power factor (about 10-15%), which can be corrected with capacitors or suffer an additional loss in the amount of power delivered. Overall, then, a hydrostatic transmission will be more efficient, cost less, weigh less, reduce the number of components, and allow the generator to be placed at ground level.

In exemplary embodiments, generator 50 is an alternating current (AC) 3-phase synchronous generator that produces grid compatible voltage and HZ when driven at a constant rpm. The hydraulic pump 52 and drive motor 54 utilize sensors to manage volume, pressure, and load. As discussed in more detail herein, the load control system receives signals from an anemometer and controls the generator load through excitation. The hydrostatic system is smart and programmable and can react and respond to the generator load with the correct pressure and volume to manage generator rpm and load.

In exemplary embodiments, the generator structure is comprised of a fixed outer housing (a stator) and rotating center (a rotor). The stator may be comprised of multiple wound copper coils (approximately 48 each). The Interior Diameter may be approximately 27" and the outer diameter of the stator may be approximately 32" and the width may be approximately 3". In exemplary embodiments, the stator includes a mounting plate and two face plates which will support the rotor bearings. The total coils may be grouped to produce three phases with each set of coils wired in parallel to minimize amperes. In exemplary embodiments, the rotor incorporates a lightweight aluminum shaft with approximately 48 coils, similar to the stator. The low weight of the rotor reduces inertia, which allows for rapid changes in RPM to optimize TSR (Tip Speed Ratio), which results in higher energy capture. A 2" drive shaft may connect to the rotor and be supported by the two bearings housed in the stator faceplates. The electrical power produced by the variable speed alternator in the form of 100 to 200 volts of alternating current will come from the three power leads coming from each phase (3 phases).

Turning to FIGS. 3-6 and 7A-13C, exemplary embodiments of a rotor and blades will now be described. Due to the innovations described herein, the power curve produced by the rotor is uniquely efficient at wind speeds as low as about five mph and ranging up to 20, 30, or 40 mph. For a blade to efficiently capture wind energy through this range of speed it must adapt its pitch, rpm, and chord width. The energy capture efficiency of the rotor is maximized by selection of optimum foil shapes for every blade station from root to tip. Moving along the blade length, the selection of optimum foil shapes at each blade station creates a new shape, blade pitch, chord length, and aspect ratio, all at a chosen low wind speed of 10 mph. As wind speed varies, rotor rpm must also vary to maintain optimum tip-speed ratio to optimize energy capture, and in exemplary embodiments, tip-speed ratio is optimized for each wind speed. In exemplary embodiments, rotor rpm is maintained at a tip-speed ratio in the range of about 7 to about 8.1.

Figure 7A:
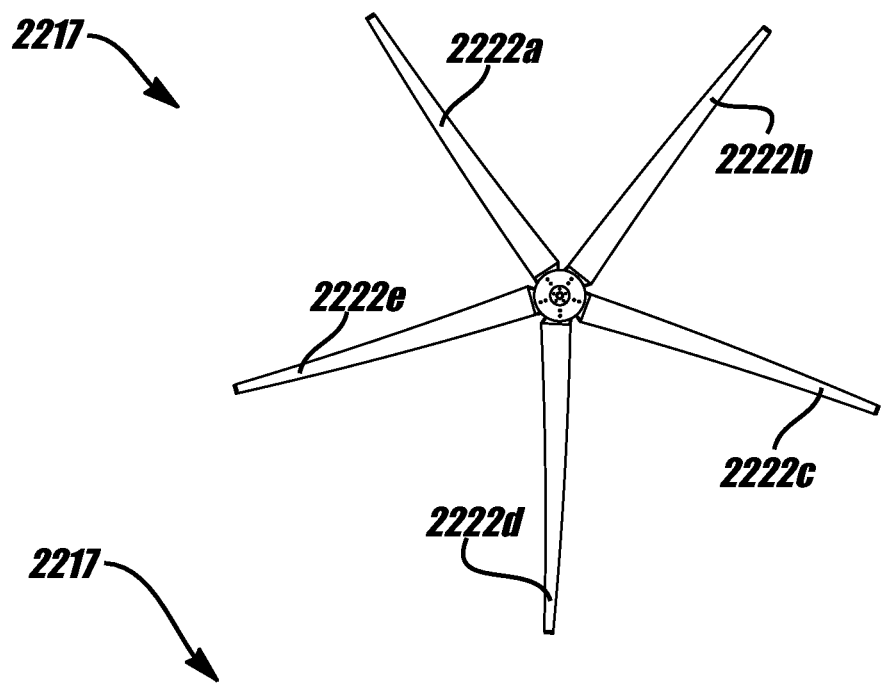
FIG. 7A is a front view of an exemplary embodiment of a rotor in accordance with the present disclosure.
Figure 7B:
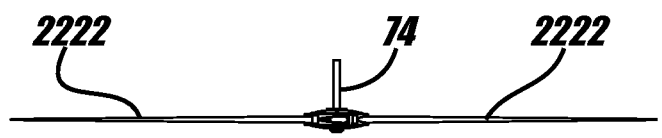
FIG. 7B is a side view of the rotor of FIG. 7A.
Figure 8:
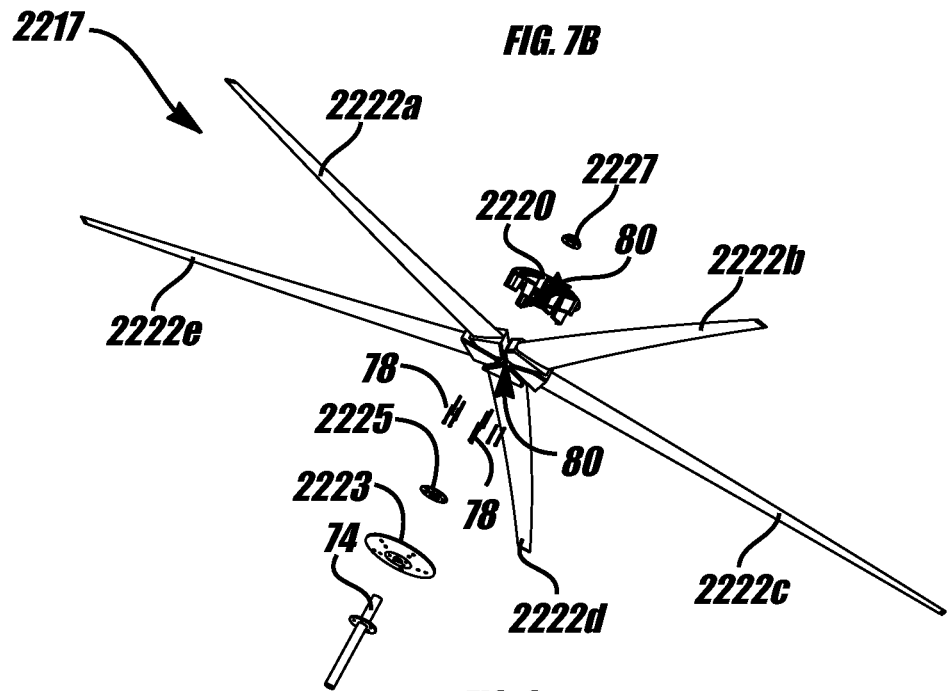
FIG. 8 is an exploded view of an exemplary embodiment of a rotor in accordance with the present disclosure.
Figure 9A:
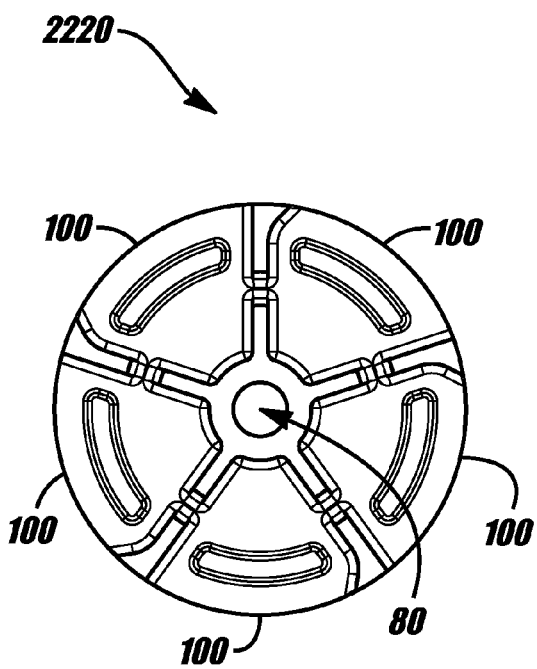
FIGS. 9A-9H are various views of an exemplary embodiment of a rotor hub in accordance with the present disclosure.
Figure 9B:
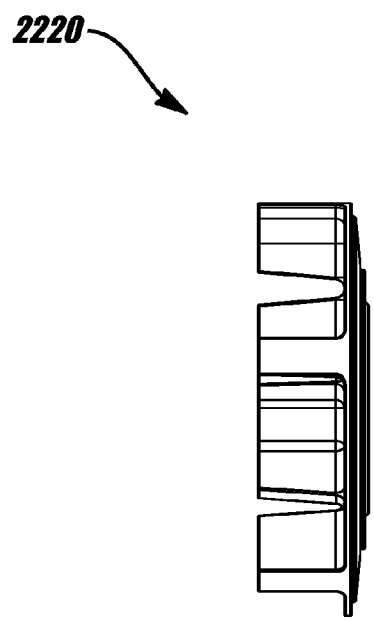
Figure 9E:
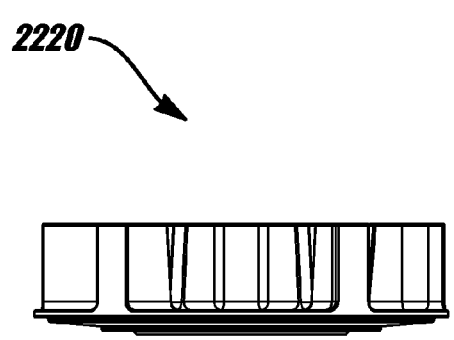
Figure 9F:
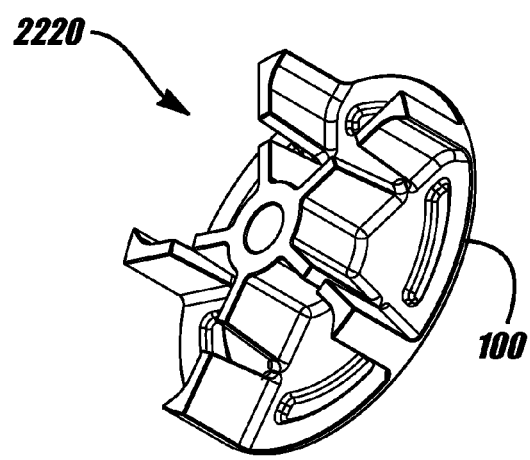
Figure 9C:
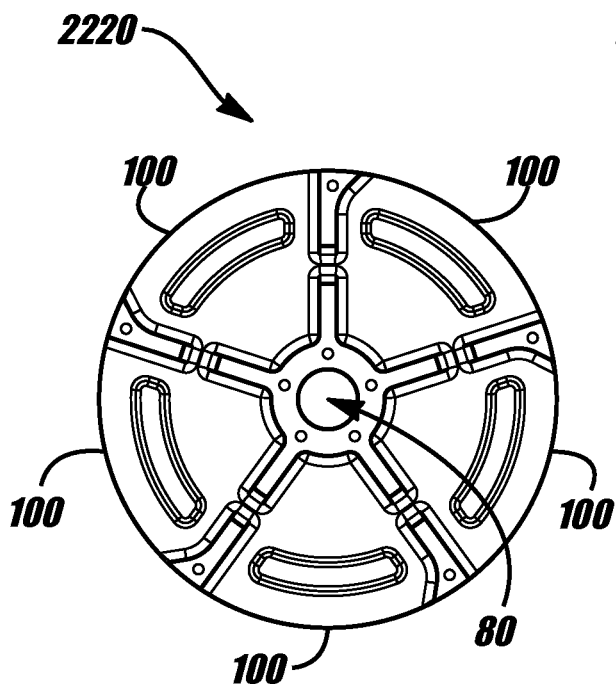
Figure 9D:
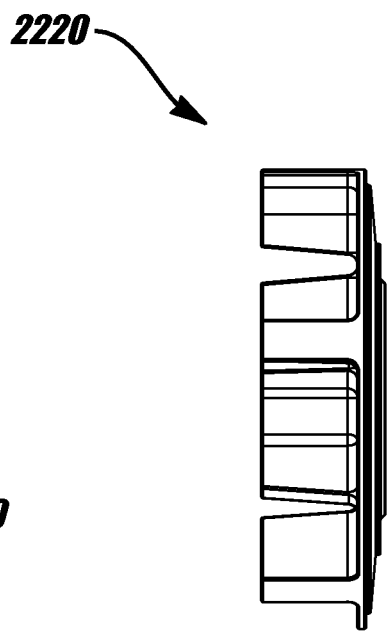
Figure 9G:
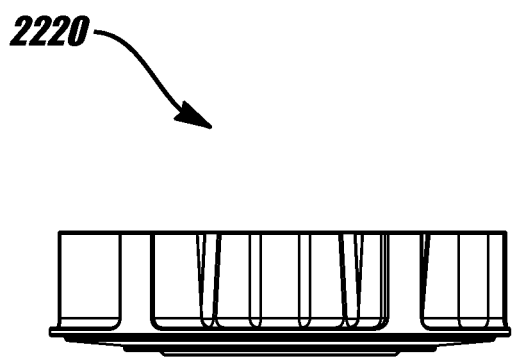
Figure 9H:
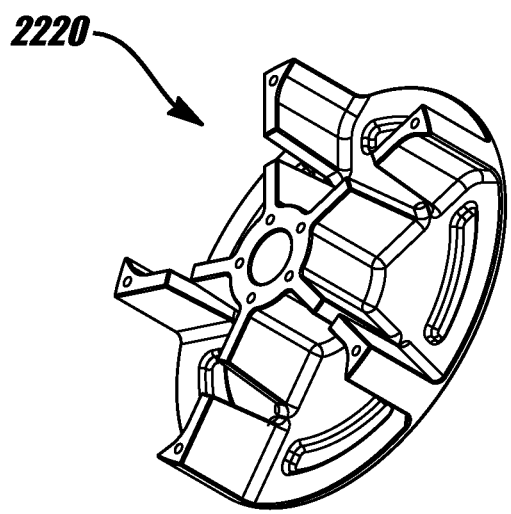
Figure 12A:
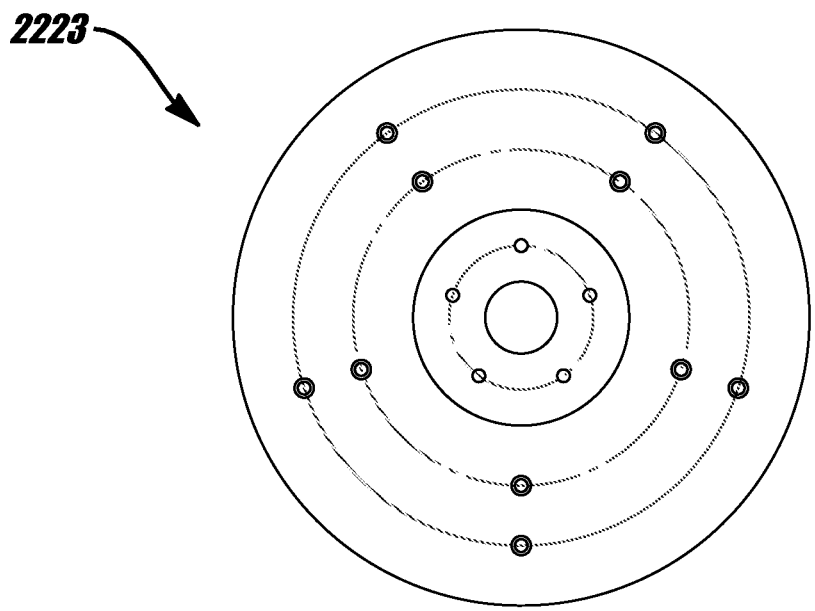
FIG. 12A is a front view of an exemplary embodiment of a hub plate in accordance with the present disclosure.
Figure 12B:
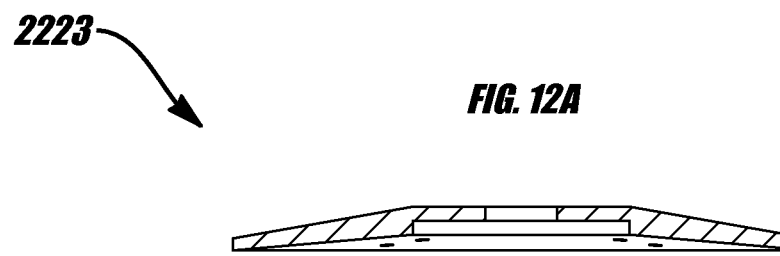
FIG. 12B is a cross-sectional view of the hub plate of FIG. 12A.
Figure 12C:
FIG. 12C is a side view of the hub plate of FIG. 12A.
Figure 14:
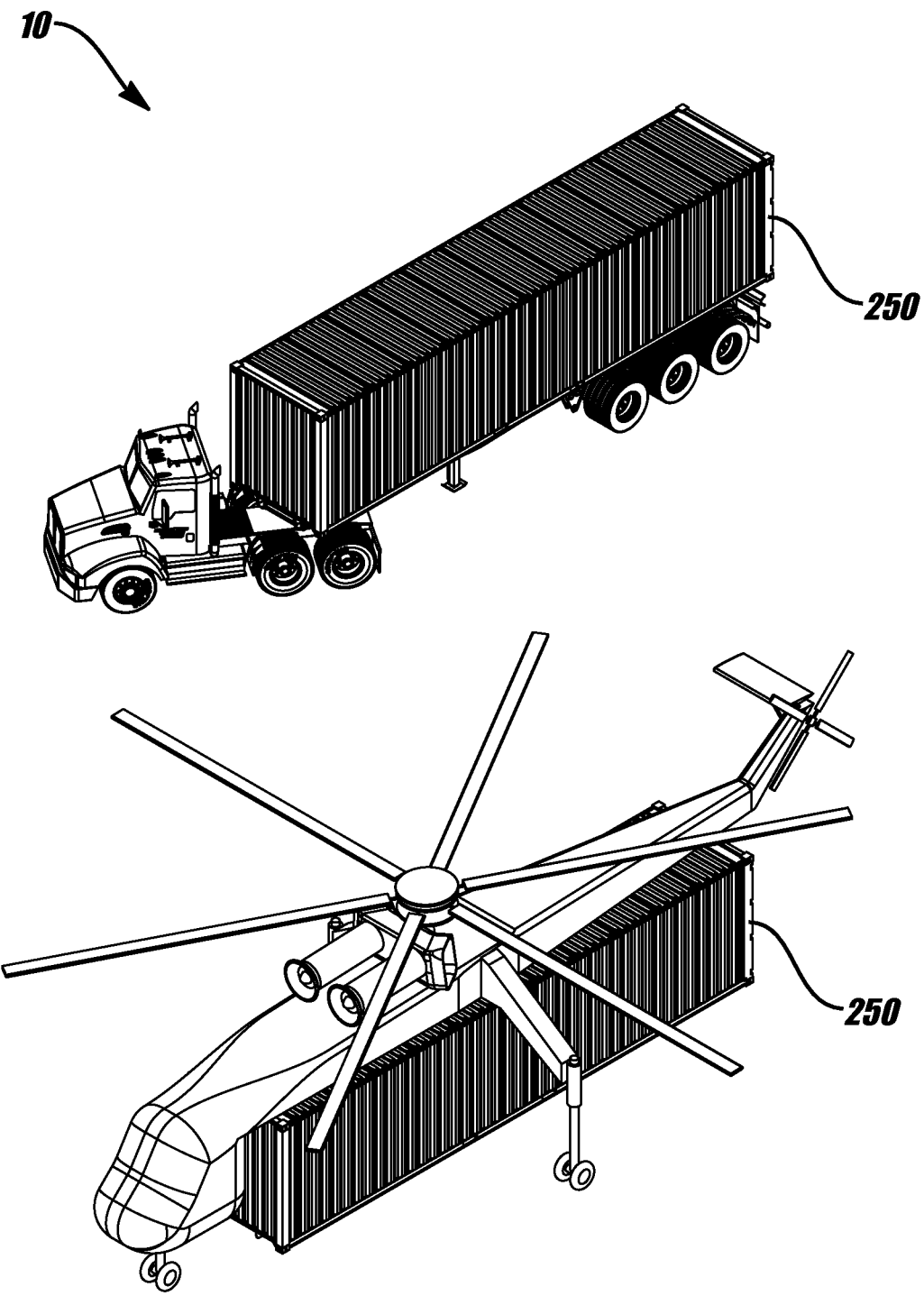
FIG. 14 is a perspective view and side view of an exemplary embodiment of a wind energy system and trailer assembly in accordance with the present disclosure.
Figure 15A:
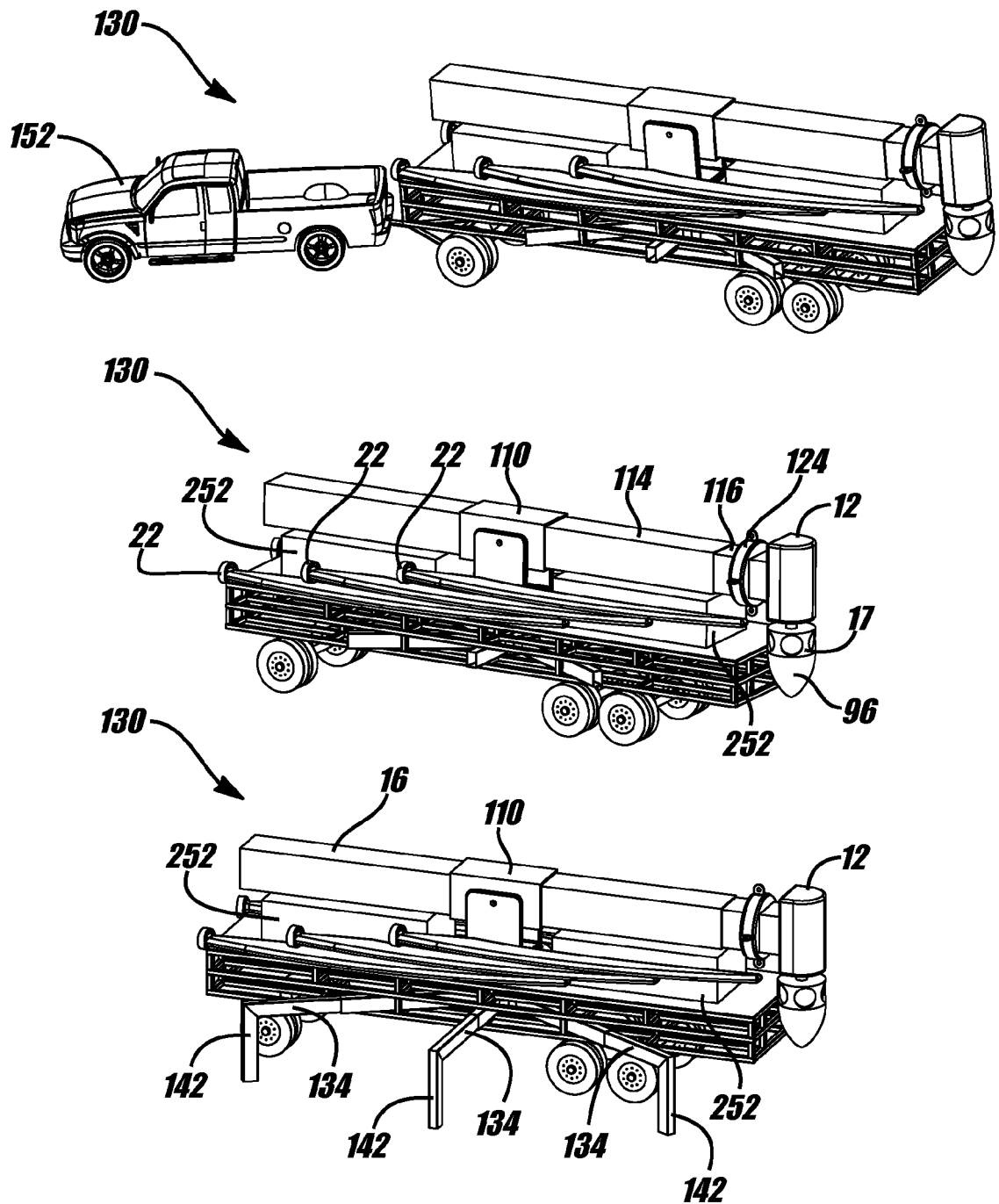
FIG. 15A includes perspective views of an exemplary embodiment of a wind energy system and trailer assembly in accordance with the present disclosure.
Figure 15B:
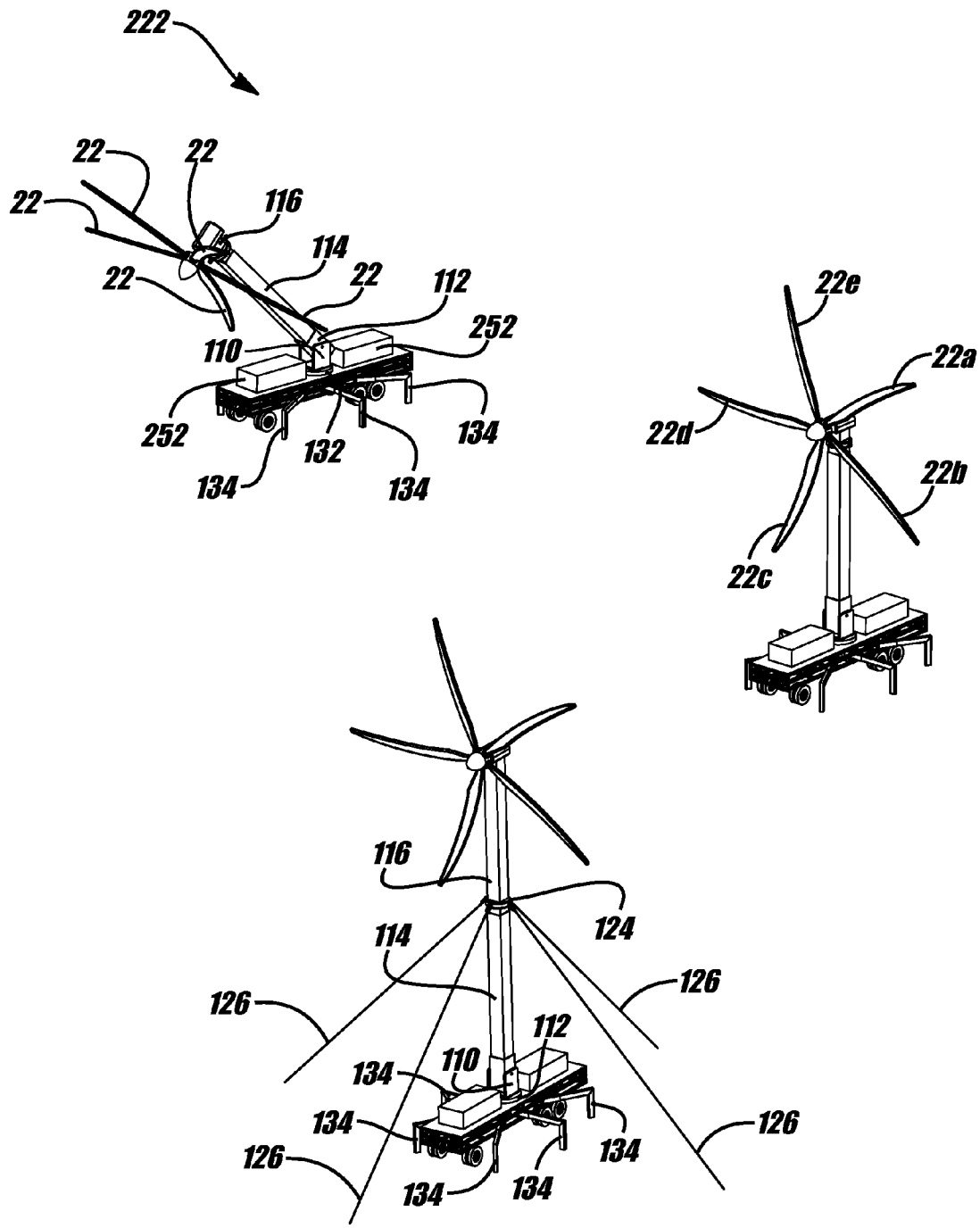
FIG. 15B includes perspective views of an exemplary embodiment of a wind energy system and trailer assembly in accordance with the present disclosure.
Figure 16:
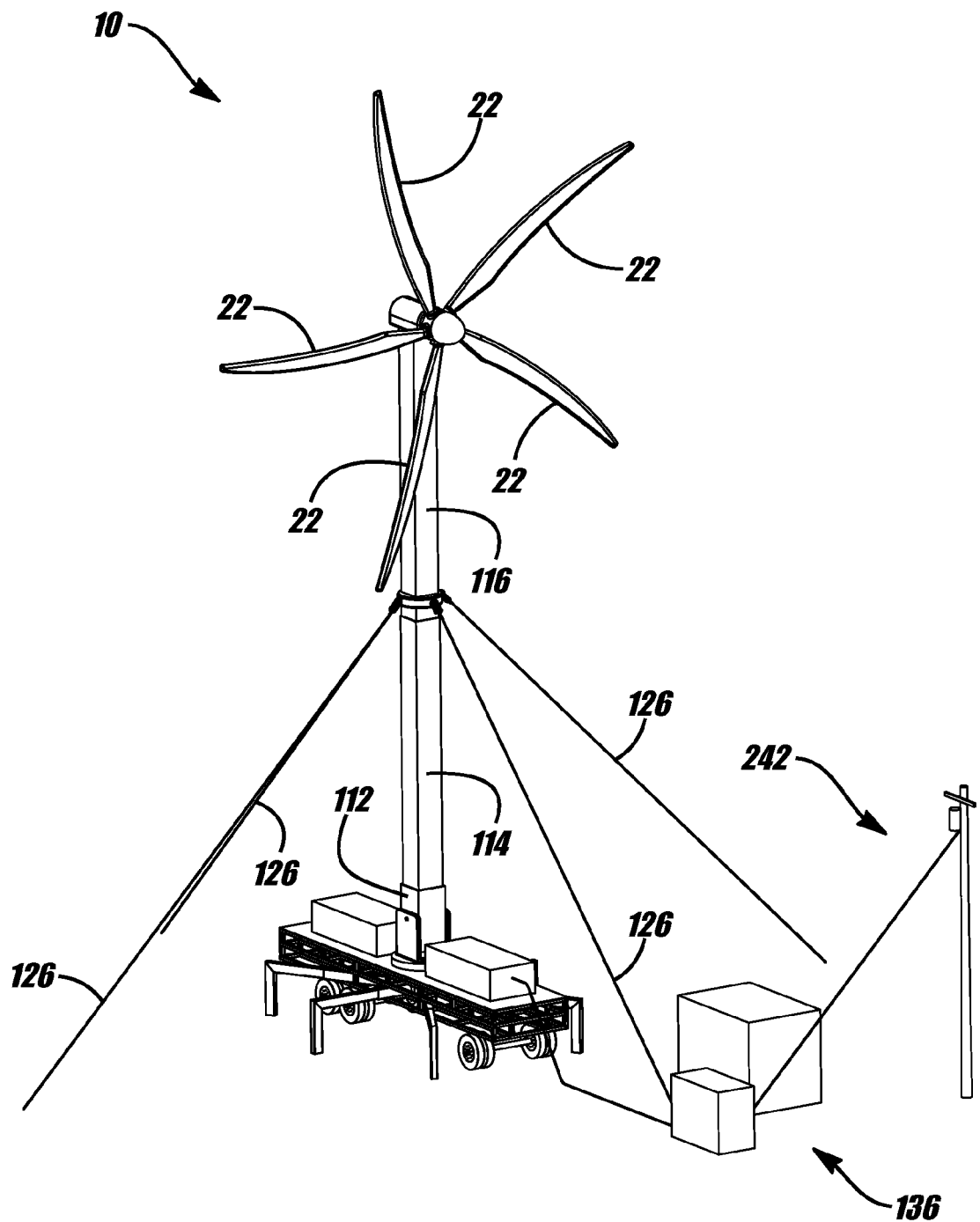
FIG. 16 is a perspective view of an exemplary embodiment of a wind energy system and trailer assembly in accordance with the present disclosure.
Figure 17:
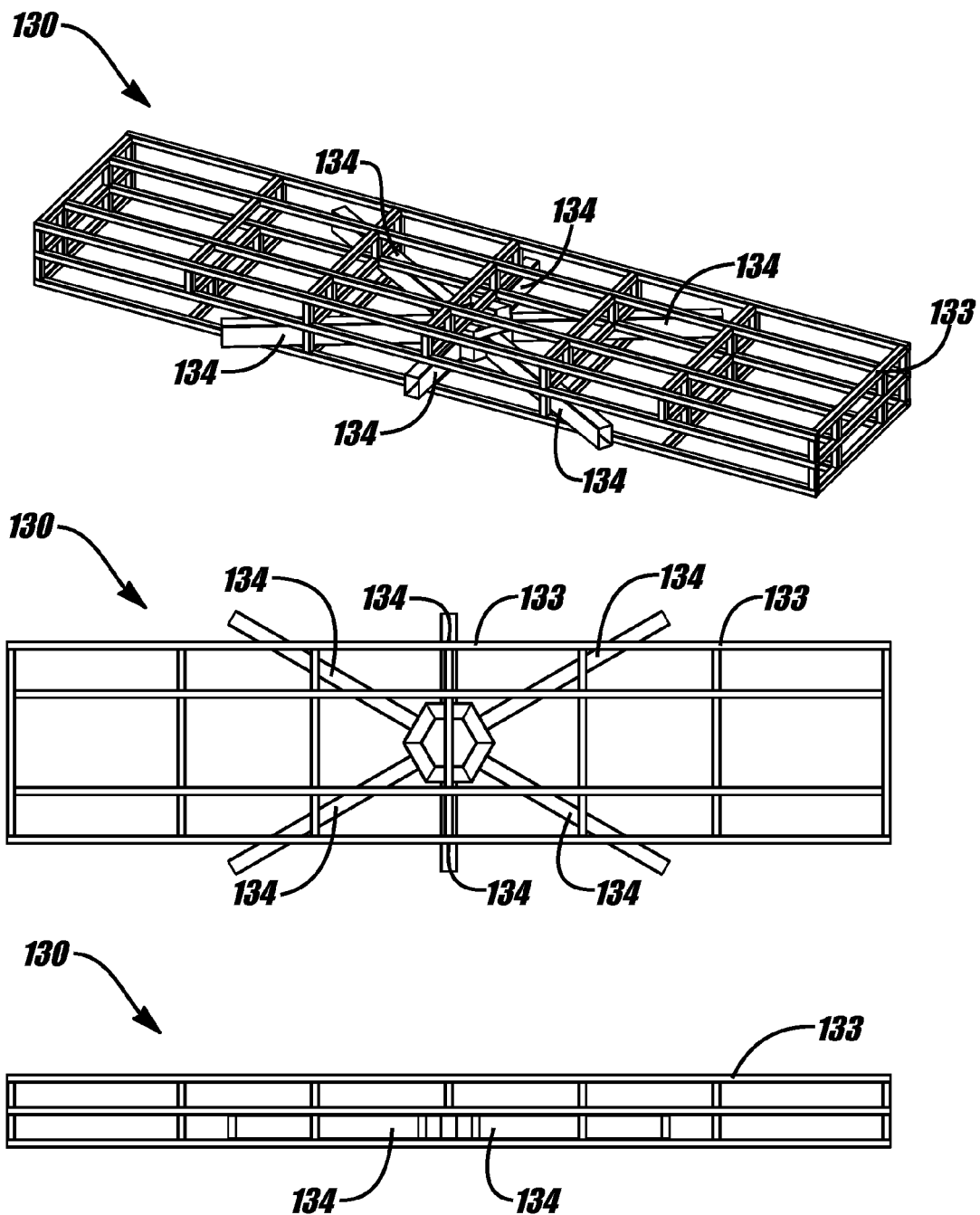
FIG. 17 includes various views of an exemplary embodiment of a trailer assembly in accordance with the present disclosure.

An exemplary rotor blade 22 has a foil shape that extends substantially the entire length of the blade 22. More particularly, the foil shape extends from the blade tip 64 to the blade root 62, optimizing the blade shape along the entire length of the blade 22 even to the root end. Unlike conventional blades, which transition from foil shape to cylindrical shape at the root, this optimized blade has the maximum surface area for contact with the wind and is tunable to local wind conditions and therefore advantageously increases the efficiency of the wind energy system. It should be noted that blade shape can be adjusted and different blades provided for different wind classes and swapped with seasonal wind strengths because each wind class benefits from a specific foil shape. In exemplary embodiments, the blades may optionally have deployable flaps 66 to maintain proper low wind speed chord section. The blades also may have winglets 68 to improve performance by reducing wing tip vortices that cause drag. More particularly, use of a removable tip with a vortex eliminator winglet would increase lift. Various coatings to reduce soiling or icing also may be applied to the blade surface. With reference to FIGS. 7A, 7B and 8, it can be seen that rotor blades 2222a-2222e have a thinner design.

In exemplary embodiments, the rotor 17 or 2217 comprises five blades 22a-22e or 2222a-2222e. This configuration increases low wind speed energy capture because it provides even greater blade surface area while reducing the diameter, or sweep, of the rotor 17 or 2217 and maintaining the desired aspect ratio. Having five blades with the proper shape (rather than increasing the area of each blade), as described above, can increase the blade area of a given rotor diameter by 40 percent. In exemplary embodiments, a smaller rotor diameter results in lower blade tip 64 speeds, allowing higher rpm and reducing stress on the turbine's drive system. A shorter blade with a longer non-functional root dimension reduces the pitch differential problem. Moreover, shorter blades reduce the chances of striking the wind energy system's mast 16. The blades can therefore be more flexible, which improves their twist response to wind gusts and keeps the angle of attack optimized.

Advantageously, disclosed methods of manufacturing blades result in lower costs, lighter weight, and higher strength blades with better performance. The costs of blade fabrication, including tooling costs, are reduced though production of simple components such as a central spar, a leading edge, a trailing edge, an adjustable flap, and an adjustable length tip with winglets. The problems of internal bonding and edge separation are overcome with such a manufacturing method. The blades may have a modular construction to make assembly easier, such as 5-piece construction, and they may be made of up to 100% resin-infused carbon fiber to decrease inertia and increase lifespan. In exemplary embodiments, manufacturing processes include vacuum and pressure forming the blades under a 500 degree oven. Use of high strength carbon fiber can reduce the weight of the blades by over 50 percent. Low blade weight reduces inertia and minimizes gyroscopic loads when adjusting to new wind angles. With lower inertia, the blade increases rpm more quickly. Overall, such features and manufacturing methods reduce operation and maintenance costs. The blades may be serviced either as a complete blade or as a replaceable component. Different shapes may be made and adjusted with optional components to accommodate different wind regions, and field service, shipping, and handling services are reduced.

It should be noted that the blades as described above provide a number of important advantages over existing blades particularly given that higher wind velocities on the blades will typically result in higher loads on the blades. In general, operating loads on the wind energy system are reduced. A major reason for this is the blade design results in surface area approximately double that of a conventional wind turbine blade, thus reducing blade loading by half. There is also less torque on the rotor and drive system with the increased rpm. More particularly, rotor rpm follows a direct ratio to the wind speed, as opposed to a conventional machine, which controls rpm. As a result, rotor torque is lessened by as much as two thirds. The blades also produce less teeter by using five blades instead of three, and because of lower blade loads, and in some embodiments, the soft null of load due to the curved blades instead of straight blades. There is also less cavitation—a parasitic load—and less noise, as both are a function of blade load and are reduced with lower blade loads. In addition, lower blade load and five blades at a higher rpm cause a proportional reduction in harmonic frequency concerns. Finally, the blade design optimizes wind energy capture in low wind speeds.

Alternative blade designs could incorporate both sweep and twist, with sweep being the curvature of the blade from root to tip in a plan view. The curve faces away from the direction of rotation. In an exemplary 50 kW blade, the sweep curves six feet from a straight line in a 21-foot length. Sweep provides a number of advantages, including but not limited to, blade area increase in a given length, gradual loss of power when passing the mast rather than simultaneous and sudden loss, reduced teetering, reduced cavitation and noise, and wind load on the end of the curved blade causes twist. Advantageously, twist improves the angle of attack with increased wind speed and rotor rpm because wind load on the curved tip causes rotation of the end of the blade rather than bending. Thus, twist improves angle of attack and blade efficiency. Alternatively, the blades could be thin, as shown in FIGS. 7A, 7B and 8.

Figure 3:
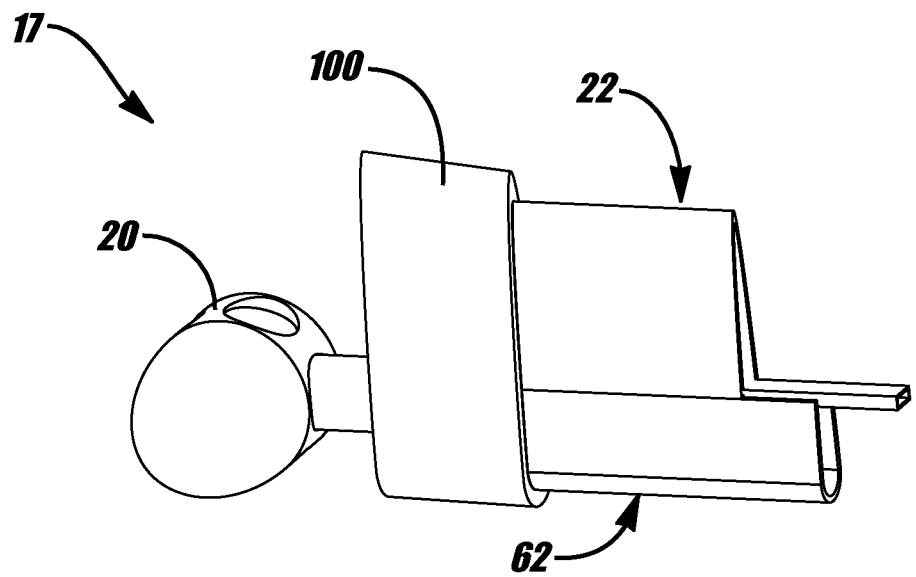
FIG. 3 is a perspective view of an exemplary embodiment of a rotor hub and blade in accordance with the present disclosure.
Figure 4:
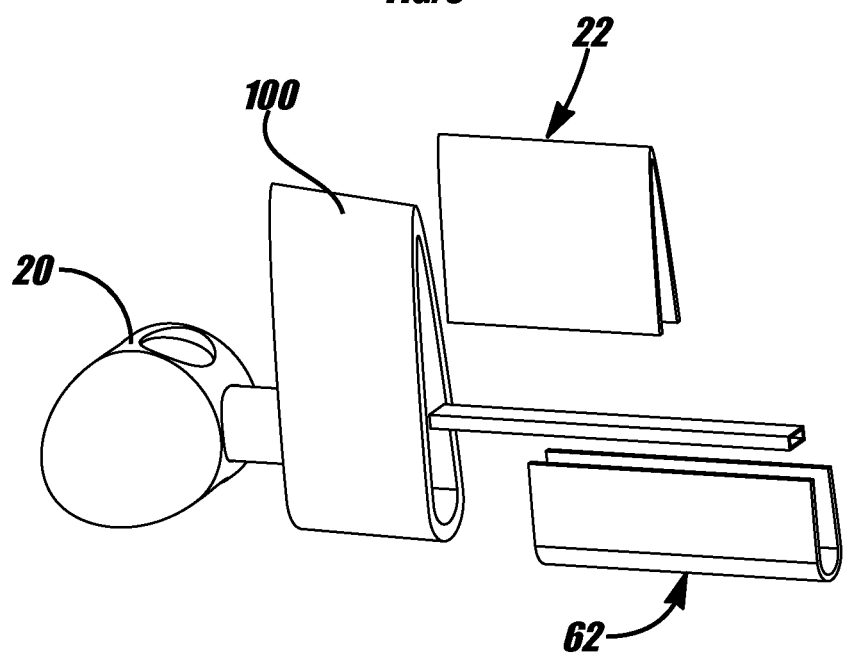
FIG. 4 is an exploded view of an exemplary embodiment of a slipper fitting in accordance with the present disclosure.
Figure 5:
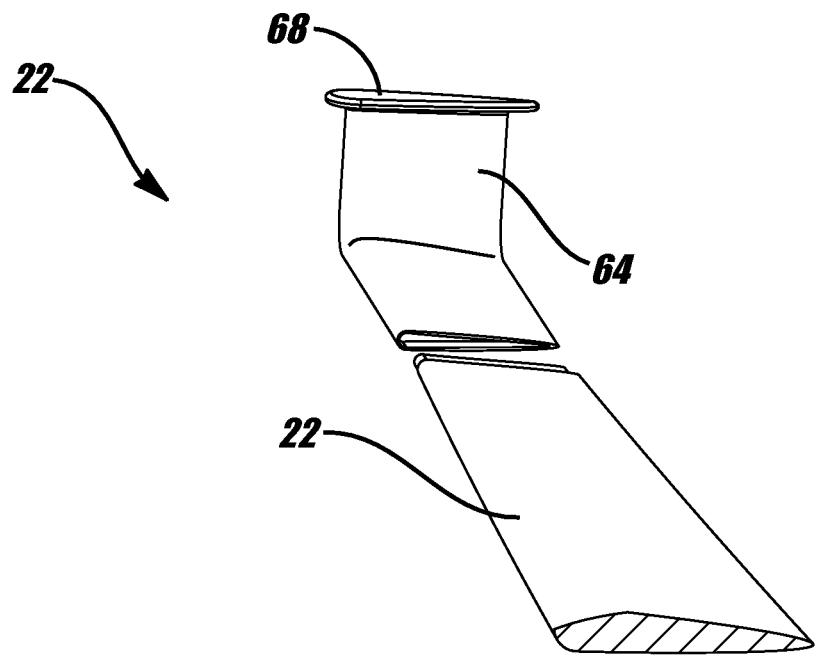
FIG. 5 is a perspective view of an exemplary embodiment of a rotor blade in accordance with the present disclosure.
Figure 6:
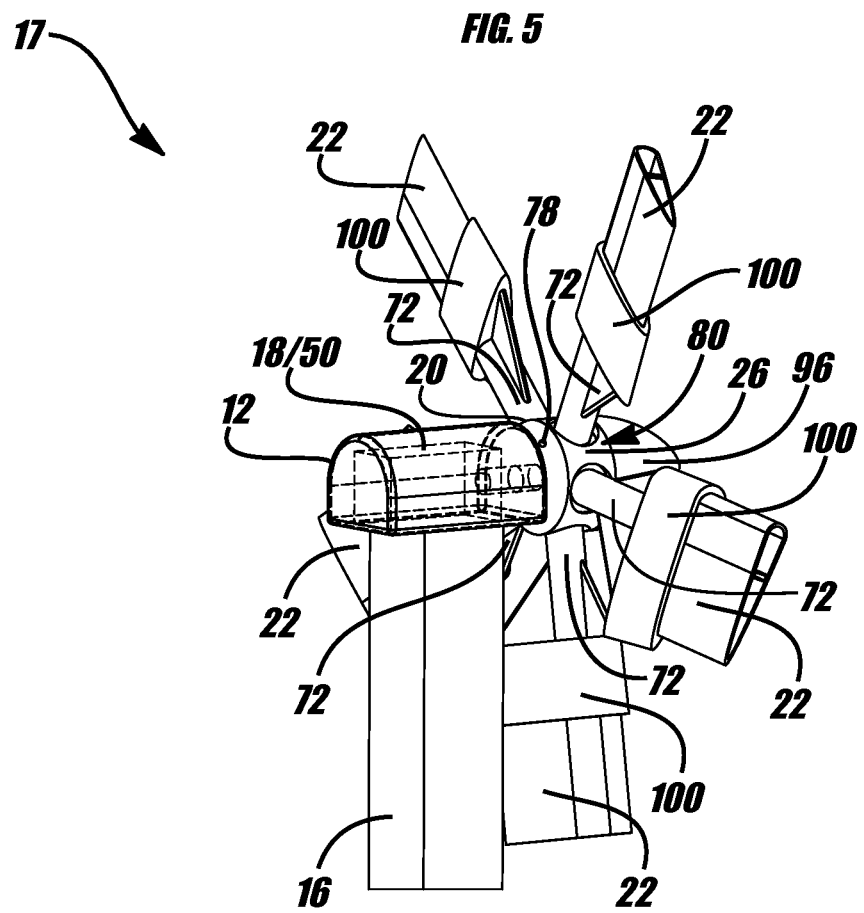
FIG. 6 is a perspective view of an exemplary embodiment of a rotor in accordance with the present disclosure.

Rotor hub 20 provides mounting and pitch control 236 for the rotor blades 22. An exemplary embodiment of rotor hub 20 is illustrated in FIG. 3 and another exemplary rotor hub 2220 is shown in FIGS. 8 and 9A-9H. Rotor hub 20 or 2220 may be a unitary component or may have a modular fabrication where each blade 22 or 2222 has its own respective cylinder cartridge 72 and drive shaft mechanism 74. In an exemplary embodiment, each cylinder cartridge 72 is joined in a "sandwich" of side plates 76 and bolts 78. More particularly, the hub may be made from two cast aluminum 24" circular discs with custom partitions to fit each of the five blades. Each drive shaft 74 is pitched in sync through a common ring gear 86 and individual worm gears 88, one for each blade 22. In exemplary embodiments, an electric variable speed reversible motor 92 is provided to drive the ring gear 86, which will in turn, drive the worm gears 88. In exemplary embodiments best seen in FIG. 8, the rotor 2217 includes shaft 74 and the hub assembly includes hub plate 2223, retaining washer 2225, and thrust washer 2227. The rotor hub 20 may define a hollow center area 80 where control wires for a pitch motor may be housed, and slip ring 11 may provide electrical power for the pitch motor. The driving process increases or decreases the pitch of the blades 22, as directed by the load control system 24. A solenoid actuated pin may be employed to lock the rotor 17 in position. For aesthetic purposes, an aerodynamic nose cone 96 may be attached to the front of the rotor hub 20. An rpm sensor 90 may also be provided to send rpm data to the load control system 24.

As best seen in FIGS. 3, 4, 6, and 9A-9H, embodiments of rotor hub 20 or 2220 incorporates specialized attachment features to accommodate the optimized blades 22 or 2222. In exemplary embodiments, the rotor hub 20 or 2220 defines a receiver, or slipper fitting 100, serving as a full foil attachment mechanism for the connection of each blade 22 to the hub 20. Alternatively, the slipper fitting 100 may be incorporated into individual drive shafts 74 for each blade 22, 2222. The slipper fitting 100 is foil-shaped and sized so the foil-shaped root 62 of each blade 22, 2222 can fit snugly into the slipper fitting 100. In exemplary embodiments, the slipper 100 replicates the foil shape of the blade 22, 2222 so the inside dimension of the slipper fitting 100 is slightly larger than the outside dimension of the blade 22, 2222. The blade 22, 2222 at or near its root 62 and the slipper 100 may be slightly tapered to assure contact on faying surfaces.

Exemplary embodiments of a slipper fitting 100 include one or more components for locking each blade 22, 2222 into rotor hub 20, 2220. In an exemplary embodiment, the locking feature is an indexed tab 102. Blades 22, 2222 could also be secured to the slipper 100 by bolts 104 into the blade insert in the base of the blade 22, 2222. Additional bolts 104 may provide micrometer adjustment of each blade 22, 2222 to ensure precise phasing, radial run-out, and/or axial run-out. To ensure accurate set-up of the blades, a gauge may be provided and may be attached to the mast 16. In addition, the blades allow for Vernier adjustment of blade alignment such as rake and phasing. The slipper fitting 100 provides a number of advantages such as maintaining chord shape, decreasing weight and cost, improving serviceability, easing set-up via snap-in blade assembly, and easy demobilization efforts. The hub design also eliminates penetrations and stress points, while maintaining blade axis and neutral axis of centrifugal loads, thus minimizing flutter and nutation. As described in more detail herein, rotor 17 may have a position relative to the blades 22, 2222 for parking, indexing 232, and locking for lay-down and shipping. This lay-down feature allows the blade area to be increased to improve low wind speed energy capture while providing a manner to protect the blades in winds that could cause damage due to the increased disc area ratio of the blades.

FIGS. 14-26 illustrate exemplary embodiments of a portable wind energy system, and its associated components, incorporating portability features such as a modular, retractable mast assembly 16 with a pivotable trunnion 110. An exemplary mast is comprised of two, three, or more sections. In an exemplary embodiment, mast 16 includes a base section 112, which may be disposed in the trunnion 110 and pivots in the trunnion. A lower mast section 114 can be slidably inserted into the base section 112, and an upper mast section 116 slidably inserted into the lower mast section 114. The size of the mast and its sections can vary depending on the application, and in exemplary embodiments the base section 112 is about five feet long and about two feet across, the lower mast section 114 is about 30 feet long, and the upper mast section 116 is about 30 feet long. In exemplary embodiments, the mast 16 is hollow to allow space for the plumbing of a hydraulic drive system, which is flexible and enables extension and retraction of the mast and its sections. The requisite cables and wires may also be threaded through the hollow mast.

Trunnion 110 can be rotated at least 90 degrees between a position horizontal to the ground and an upright position vertical to the ground. Because it is held by the trunnion 110 via base section 112, mast 16 is rotatable between a horizontal, retracted position centered in the trunnion and a vertical position and may include a quadrant gear and worm gear. In exemplary embodiments, the trunnion 110 is rotated through use of a quadrant gear 118 and a worm gear 120 driven by a hydraulic motor 122. The worm gear thread pitch ensures that the load on the trunnion 110 will not unwind the gear, providing failsafe raising and lowering as the trunnion rotates. Lower mast section 114 may be extended and retracted using a gear assembly such as a rack and pinion gear driven by a hydraulic motor 122, and the pitch of the pinion prevents unwinding. The upper mast section 116 has a similar gear arrangement. The mast may include a rotating collar 124 attached to its upper section 116 to allow rotation of the mast. In exemplary embodiments, the collar 124 will relax as the upper mast section 116 is lowered to allow automatic laydown in any chosen wind speed. In exemplary embodiments illustrated in FIG. 25, there are two SS mast collars 124 with self-aligning cable connections and rigging tangs 123. One or more guy wires 126 can be attached to the collar 124 to provide stability 244 in high winds. In exemplary embodiments, four guy wires 126 are provided, and up to 12 (6 upper and 6 intermediate) or more guy wires could provide upright stability to six outrigger end points. Stability is provided to 80 mpg without ground anchors.

An exemplary embodiment of a trailer assembly 130 provides the ability to easily and efficiently transport, deploy, and support exemplary wind energy systems. As shown in FIGS. 14-17, an exemplary embodiment of a trailer assembly 130 comprises a central turntable, or carousel 132, a plurality of deployable outriggers 134, a hydraulic system, a frame assembly 133 including a trailer tongue 137 shown in FIG. 26, and a self-contained command center control station 136 with a control panel that enables full operation of all functions of the trailer assembly. The trailer assembly may also incorporate a plurality of lift cables and two gin poles 165 with connecting tangs 167, shown in FIGS. 22-23. In exemplary embodiments, four lift cables resolve to two cables that consolidate to a single winch cable 175, shown in FIG. 24, to assure synchronism.

Figure 19:
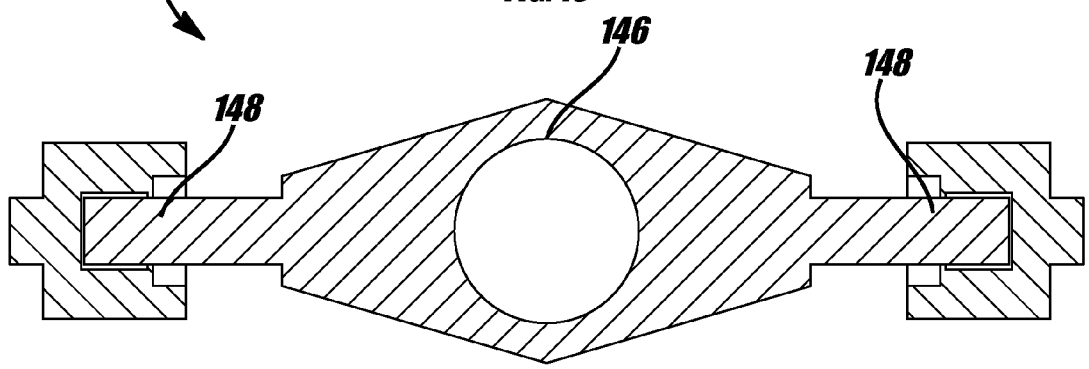
FIG. 19 is top view of an exemplary embodiment of an A-frame mast support and pivot bearing in accordance with the present disclosure.
Figure 22:
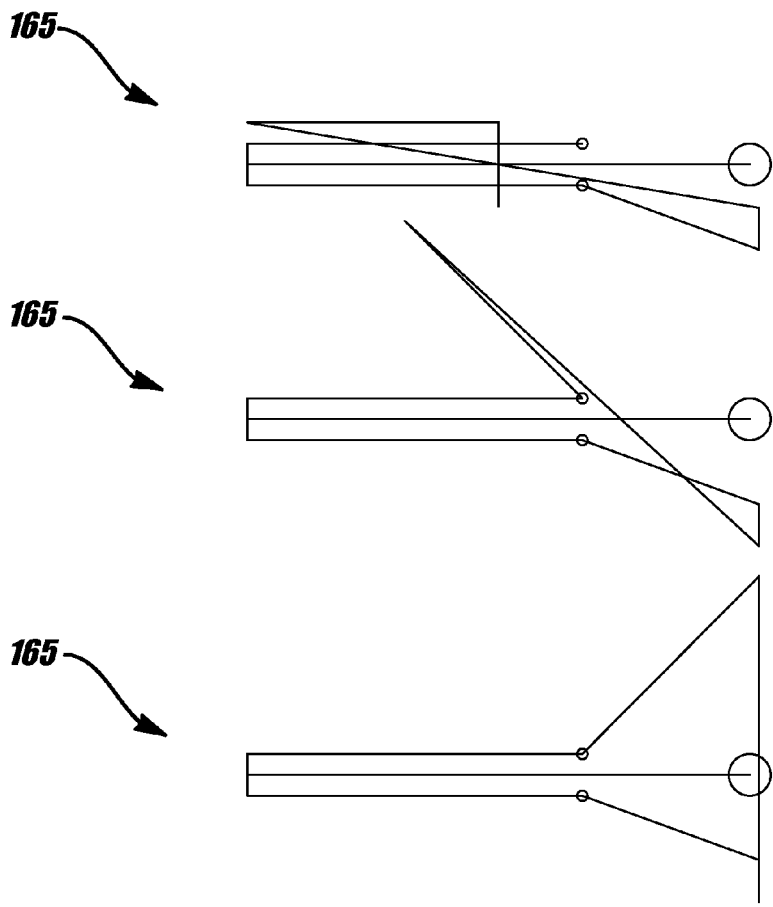
FIG. 22 includes various views of an exemplary embodiment of a gin pole in accordance with the present disclosure.
Figure 24:
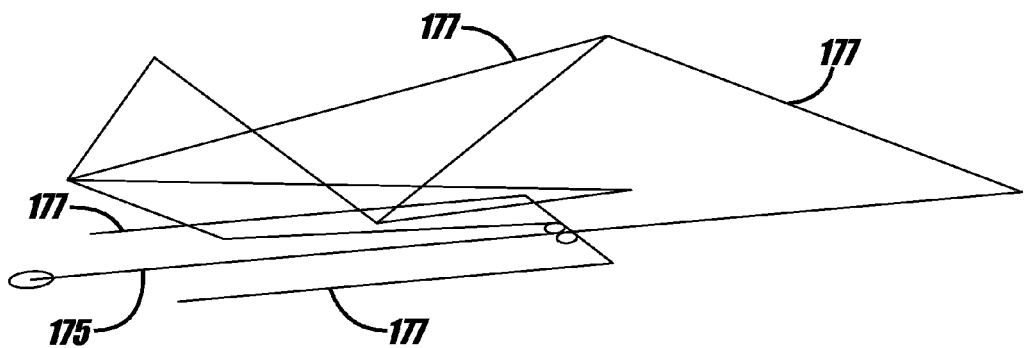
FIG. 24 is a perspective view of an exemplary embodiment of a winch and lift cable in accordance with the present disclosure.
Figure 23:
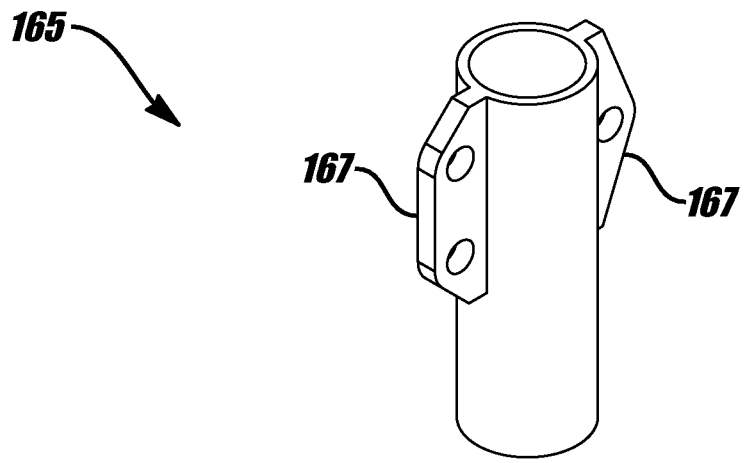
FIG. 23 is a detail view of an exemplary embodiment of a gin pole and connection tangs in accordance with the present disclosure.
Figure 25:
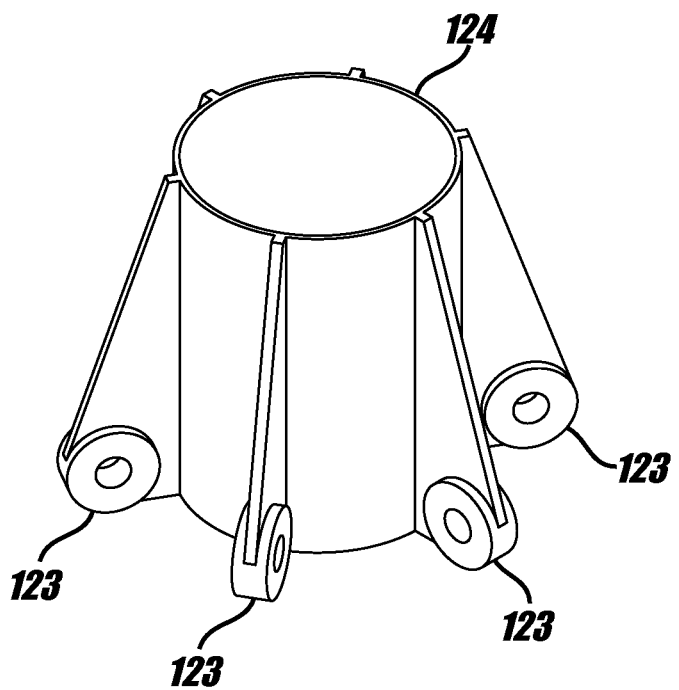
FIG. 25 is a perspective view of an exemplary embodiment of a mast collar and rigging tangs in accordance with the present disclosure.
Figure 26:
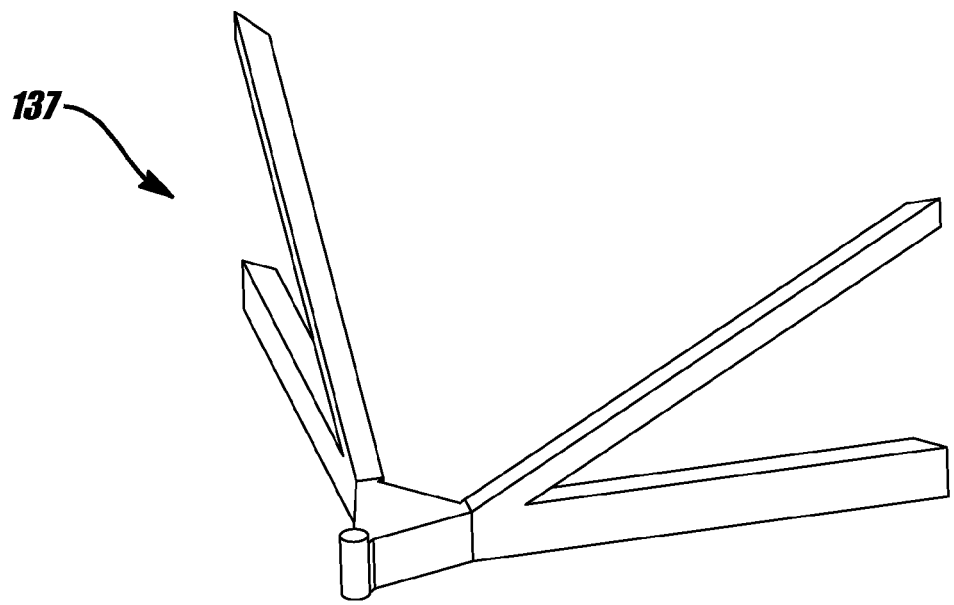
FIG. 26 is a perspective view of an exemplary embodiment of a trailer tongue in accordance with the present disclosure.

With reference to FIG. 24, the single winch 175 may attach to two forward lifting cables 177 through a pulley guide system 155, shown in FIG. 20, and connect to the two gin poles 165 that connect to four rear mast cables. The use of a "helm" ball joint enables the two gin poles 165 to follow an unnatural arc as the mast is raised and lowered. This maintains stability when raising and lowering and enables unmanned lowering through remote control. An on deck guide may be provided to prevent side sway when the gin pole is raised from the horizontal position. A pin in the guide may be provided to start the gin pole 10 degrees above the deck. An on deck storage and quick pin system may be provided to engage the gin pole 165. The outriggers are lightweight and in exemplary embodiments include six equally spaced outrigger jacks accommodating about 30 feet of terrain slope. Carousel 132 supports the wind energy system's mast assembly 16 and yaw control and has a rotational system for shipping including a locking pin. An exemplary carousel 132 includes trunnion 110 of the mast assembly 16, a housing for the generator or alternator, a central retractable grounding stake 138 (including a lightning grounding system), a central slip ring 140 to deliver electricity to the output cable, and a yaw gear and yaw motor drive system. The yaw gear may be of various diameters and in exemplary embodiments is about six feet in diameter. As illustrated in FIG. 19, a frame mast support 145 including a central shaft 146 and bearings 148 support the trunnion 110 and mast 16 and allows continuous rotation of the carousel 132, otherwise known as an "endless rotation" capability. The rotating carousel design eliminates the problem of cable wind-up as the wind turbine follows the wind in endless circles.

As seen in FIG. 21, trailer assembly 130 may incorporate eight deployable outriggers 134 with ground pads 142 and screw jacks 144 that provide a level and stable platform for operation of the wind energy system. In exemplary embodiments, a battery powered hydraulic system 150 to assist in set-up is incorporated in the trailer assembly 130. Various thrust bearings and tower support bearings may be provided as well. Advantageously, ample deck space and enclosures may accommodate five blades as well as various components and systems for different applications such as an air-to-water systems 240, a hydrogen dissociation system 212, a biodigester, capacitors 214, batteries, energy stabilization equipment, inverters, a guy wire and anchor system, and other specialty tools and equipment. The tires and high-low suspension system are retractable to allow lower storage and transportation in a container 250 and allowing the outrigger stabilization feature to be stored and utilized. The requisite safety features are also provided in the trailer assembly 130, such as lights, brakes, security and a towing bar. The trailer assembly 130 may include a two-legged frame to stabilize the 8-foot mast. An integral locker with access doors may be provided to stow electrical cables. A sleeve (one foot, in exemplary embodiments) may be provided to fit the lower mast extension with the retainer and indexing tabs.

Figure 18:
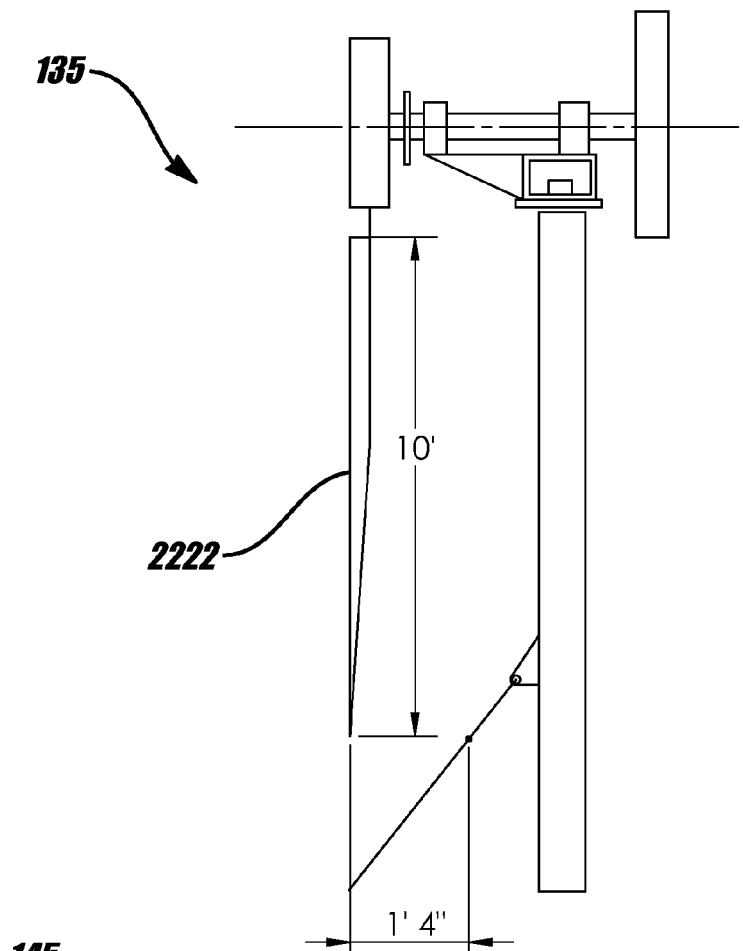
FIG. 18 is a side view of an exemplary embodiment of a blade tip and rigging assembly in accordance with the present disclosure.

To transport and deploy an exemplary embodiment of a wind energy system, all of the components and systems are loaded into the trailer assembly 130 with the mast 16 loaded in a horizontal position and fully retracted and centered having an overall stowed length of about 30 feet, the rotor hub 20 and nacelle 12 attached to the top of the mast 16, and the other components stowed in the appropriate storage compartments 252. The entire wind energy system resides on the trailer and typically weighs only about 10,000 pounds in total. A solenoid pin 154 may be used to keep the trunnion 110 in locked position so the stowed mast remains secure. The trailer's custom design enables storage of all necessary components for self-sufficiency and portability. Stored in the trailer are the mast sections, the complete nacelle, including a custom trolley to move the nacelle to the mast connections, outrigger extensions (six, in exemplary embodiments), manual jacks (six, in exemplary embodiments), jack pads (six, in exemplary embodiments), and all rigging, including blade tip rigging 135 as shown in FIG. 18. The trailer assembly 130 could be packed into a standard shipping container for ease of transport via train, ship, plane, helicopter, or other means of travel. The fully loaded trailer assembly is attached to the back of a standard truck 152 (or rail, ship, even aircraft), which is then driven to the desired site for the wind energy system.

The trailer assembly 130 is then detached from the truck 152 and the wind energy system is ready for set-up. Outriggers 134 are deployed and spread to level and stabilize the trailer 130. The upper section 116 of mast 16 is extended horizontally beyond the back end of the trailer assembly 130, so the users can attach the blades 22. Although most of the upper section 116 of the mast 16 remains disposed within the lower section 114, the users have access to the top of the upper section 116 and the nacelle 12 and rotor hub 20. The users can then quickly and easily insert each blade 22 or 2222 into its respective slipper fitting 100 to attach the blades 22 or 2222 to the rotor hub 20 or 2220.

During set-up of the rotor, hub, and blades, the hub may be secured to the drive shaft, which is locked and oriented vertically, causing the hub to be parallel to the ground surface. The hub discs are opened wide to allow the blade attachment wedge to be fully inserted. A retaining washer may hold the blade in place until the lower hub disc is drawn tight through use of a large central bolt. The tapered and wedge shape of the blade attachment is forced to align with the partitions in a fully inserted position. The blade can be precisely indexed, resulting in perfect clocking, zero run out, with the blade secure from escape due to centrifugal forces. Ease of accurate attachment of the blade to the hub, and detachment from the hub, enables portability and repeated accuracy by installers worldwide.

Using the command center control station 136, the users may input a command for the wind energy system to be raised 222 from its horizontal stowed position to its vertical operational position. The hydraulic system 150 begins its operation, and trunnion 110, holding the mast 16, begins its 90-degree rotation from a horizontal to a vertical position. In exemplary embodiments, a quadrant gear and worm gear are driven by a hydraulic motor to rotate trunnion 110. In exemplary embodiments, the initial lifting load is reduced with the aid of a pneumatic device at the foot of the trailer bed. Lower mast section 114 is extended using a rack and pinion gear driven by a hydraulic motor 122. When the lower mast section 114 reaches full extension, the sliding pieces engage a tapered self-centering and locking fit to prevent the mast from wobbling.

The upper mast section 116 is extended via a similar gear arrangement so the wind energy system is at its full height, and guy wires 126 are attached to rotating collar 124, attached to anchors and tensioned to maintain stability of the wind energy system 10. Spring tensioners may be anchored at each outrigger. Two universal "Heim" joints may be utilized to allow gin poles to sweep and twist through an unnatural arc as a mast lift cable aligns with an outrigger pulley. Two gin poles 165 are guided until their natural alignment is dictated by the lifting load. It should be noted that the collar 124 could be used to rotate the wind energy system 10 so it is deployed to face the desired direction from whence the wind is blowing. When the mast 16 is fully extended and upright, solenoid pin 154 can secure the trunnion 110 in locked position. Rotor indexing and locking 232 capability may be utilized at this point. The wind energy system is now ready to begin generating power.

Advantageously, the portable mast and trailer assembly enable laydown of the wind energy system to avoid dangerous weather conditions, such as very strong winds, where overloading and damage frequently occur in fixed site wind turbines, and facilitate service and maintenance of the system. This could be fully automatic, unattended park, lock, and lay-down ("fold tent") to mitigate storm damage. The guy wires 126 would be disconnected from the anchors and the collar 124, and the users would input a command into the command center control station 136 to lower 224 the upper mast section 116 into the lower mast section 114. If a solenoid pin 154 is used, it would then be removed to unlock the trunnion 110. Then, using the command center control station 136, the users would input a command for the wind energy system to be lowered from a vertical operation position to a horizontal position. The hydraulic system 150 would rotate trunnion 110 from a vertical to a horizontal position. The blades 22 could be removed and the system safely stowed in the trailer assembly 130.

There are at least four exemplary methods to adjust the height and level the trailer including, but not limited to, use of electric jacks (three, in exemplary embodiments) located on the trailer to raise and level, use of manual jacks (six, in exemplary embodiments) at each outrigger outer end, drop extensions on each manual jack, and/or multiple vertical bolt options to attach the jack to the end of the outrigger.

In addition, repairs or service could easily be performed on the horizontally oriented wind energy system because the system and its components, including the generator, nacelle, rotor, hub, and blades, would be close to the ground. This ability to perform service work at ground level rather than high up in the air dramatically reduces operation and maintenance expense and may eliminate the need for specialty tradespeople. It should be noted that these lay-down operations could be automatically controlled by the load control system 24 of the wind energy system 10 so the wind machine could automatically lay itself down in the event of a storm or other heavy wind conditions.

Figure 28:
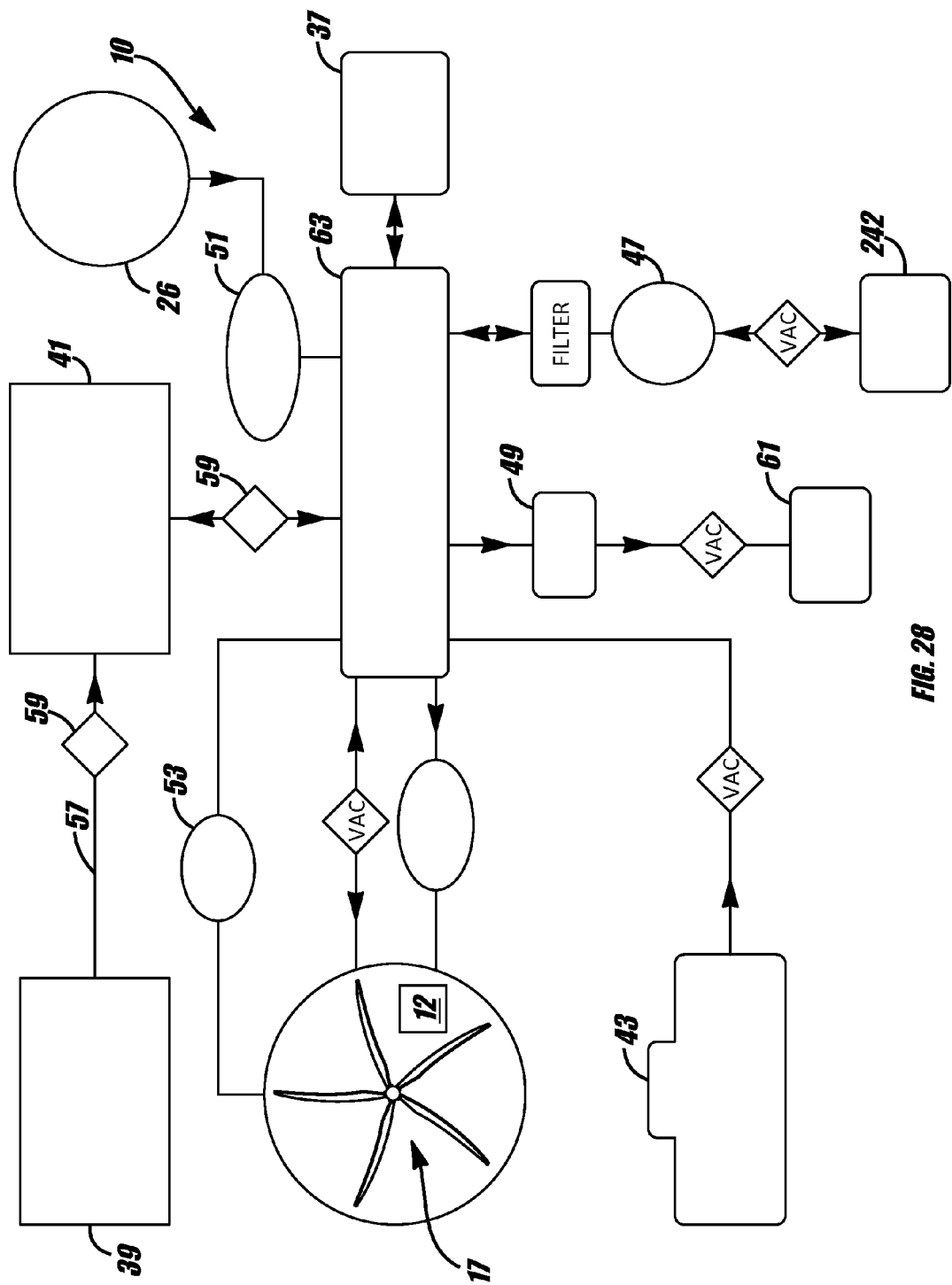
FIG. 28 is a schematic diagram of an exemplary embodiment of a wind energy system logic and control system in accordance with the present disclosure.

With reference to FIGS. 2 and 28, exemplary embodiments of a load control system will now be described. Load control system 24 provides sophisticated overall programming and control of the wind energy system 10 and manages its functions, including anticipating changes in wind speed, direction, and level of energy. As described in detail herein, the load control system 14 processes input and output data to measure wind energy and control the generator load, adjust hydraulic oil press and volume to control rotor and generator rpm, control speed and reaction timing of yaw, control blade pitch to optimize angle of attack, and brake, park, and automatically lay the mast and rotor down to prevent damage due to various conditions. In exemplary embodiments, the load control system 24 includes an overload protection system 25 configured to anticipate and monitor for overload conditions.

Data from an anemometer 26 and/or a weather service, including data for wind speed, direction, and duration, is used to program the load control system 24. Unlike conventional wind turbines, which use data from an anemometer to control limited discrete functions of the turbine, in the present system data from the anemometer can be used for proper and automatic operation of the overall wind energy system, including but not limited to, yaw 216, rotor, pitch, transmission, generator, alternator, brakes 218, and mast. The load control system 24 also receives data from the wind energy system components, including but not limited to, data via an rpm sensor on the rotor 17.

Anemometer 26 may be mounted to the top portion or other part of mast 16 or to another part of the wind energy system 10, including, e.g., to a portion of the rotor 17. Alternatively, an anemometer may be physically separate from the wind energy system. Anemometer 26 is in communication with load control system 24, which is in communication with the alternator 18 or generator 50. The anemometer 26 sends a signal out through the entire 360-degree horizontal circle around it, and the signal reflects from dust particles in the air. The distance from the rotor 17 to the detection point of the anemometer 26 can be pre-selected to provide time for the load control system 24 to analyze wind velocity and kinetic energy. Anemometer sends this signal to the load control system 24, which utilizes Doppler measurement and other methodologies to analyze the data and determine the speed, direction, and level of energy in the wind. The load control system 24 compares these results as to speed and energy with those of the wind currently driving the blades 22, 2222 of the wind energy system 10 and, as discussed in more detail herein, makes decisions about the operation of the wind energy system. For instance, the load control system may adjust alternator load to optimize rotor rpm and optimize tip-speed ratio 234.

In operation, the wind energy system is deployed as described above and converts kinetic energy in the wind to mechanical energy and ultimately electrical energy as follows. The wind flows across the optimized full foil shape of each of the five blades 22a-22e, 2222a-2222e turning the blades and the full rotor 17, 2217. It should be noted that the wind energy system can operate at very low rpm, e.g., 50-170. More particularly, when the wind is blowing the rotor will spin, creating electrical power from very low rpm. Wind speed across the leading edge of each blade typically varies from about 1-30 mph near the root and 70-210 mph at the tip. Rotor 17, 2217 is connected to alternator 18 via rotor hub 20, 2220 and the rotation of the rotor 17, 2217 is thus transferred to the alternator 18, which uses a rotating magnetic field to convert the mechanical energy of the rotor 17 to electrical energy. More particularly, vanes 32 are rotated by air entering the alternator 18 and moving laterally across the vanes 32, thereby rotating the alternator rotor 28 and inducing a current in the field coils 38. This current may be sent down the appropriate cables in the hollow mast 16 and fed into a utility grid 242, used directly by a nearby distributed load facility, or stored in various forms and by various methods as discussed in more detail herein.

In exemplary embodiments, the output voltage of the alternator 18 varies from about 100 to 200 VAC 3 phase, and frequency varies from about 20 to about 60 HZ. Output power may be in the range of zero to about 10 kWatts, but could also range up to about 50 kW. The AC power may be rectified in a variable frequency drive (VFD/inverter) to DC voltage and then converted into desired AC/DC output voltage and desired frequency to deliver AC power to a grid connection 242 through a two-way meter, to a stand-alone output, or to charge batteries 220.

Instead of transferring the wind energy to an alternator, it should be noted that rotor 17 could feed into a hydraulic, or hydrostatic, drive system. In such embodiments, the hydrostatic transmission utilizes smart programming to drive a synchronous generator 50 at constant rpm. More particularly, the rotor 17 transfers rotation to a generator 50 instead of the alternator described above, and a hydraulic pump 52, and a drive motor 54 aids in delivering rotor power to the generator 50. The transmission uses a speed-regulating governor that allows the rotor to spin at any rpm to maintain optimum tip-speed ratio with the wind while at the same time instant spinning the generator at a constant rpm to enable direct grid-tie at grid frequency. The hydrostatic drive system advantageously eliminates power factor issues and the need for a gearbox, transformers, inverters, capacitors, brakes, and pitch stall.

While the wind energy system 10 is operating as described, a radar speed detecting anemometer 26 is continually sending signals out to measure the speed of dust particles in the wind that are approaching the system 10. As the anemometer receives data in return, it sends the data to the load control system 24. The load control system utilizes Doppler measurement and/or other methodologies to analyze the data and determine the speed, direction, and level of energy in the wind. As the wind energy system 10 is operating, the load control system 24 compares its results as to speed, direction and energy with those of the wind currently driving the blades 22, 2222 of the wind energy system 10. Based on this information, the load control system 24 makes decisions about the operation of the wind energy system 10 and may alter its operation.

With reference to FIG. 28, it can be seen that the anemometer 26 sends a Wind-Speed Signal 51 to Variable Frequency Drive (VFD) 63. The wind turbine including rotor 17 and nacelle 12 sends a rotor RPM signal 53 to VFD 63. VFD 63 may use reverse EMF to control torque on the rotor 17, thereby regulating rotor RPM to maintain optimum tip speed ratio (TSR). Photovoltaic panels 39 may generate solar power (when available), send power through charge conditioner 57 and charge batteries 41 with DC power 59. If batteries 41 are charged, the PV panels 39 shut down autonomously. If mobile power station 10 is connected to the utility power grid 242 (net metering), 100% power is delivered to the utility. If it is feeding local power demand 61, VFD 63 monitors the demand. If the local power demand 61 exceeds the power being generated by the wind turbine, VFD 63 request deficit from batteries 41. If the batteries 41 are unable to fulfill the request for power, then VFD 24 instructs the diesel generator 43 to start and deliver needed power.

In exemplary embodiments, if the speed and energy in the new wind are stronger than that of the wind currently driving the blades 22, 2222 the load control system 24 adjusts blade pitch, which causes rotor rpm and pitch to match the higher speed wind. As wind speed changes, the rotor rpm changes with it to maintain a tip-speed ratio in the range of about 7 to about 8.1. Load control system 24 may also make a determination as to whether the energy in the new wind justifies turning the blades 22, 2222 to face the new oncoming wind. In exemplary embodiments, the load control system 24 is always looking for stronger wind energy from gusts and monitoring wind variability to anticipate changes in the wind. Once the load control system has determined that a new direction would be beneficial, it will make required adjustments such as sending a command to the yaw motor to turn the mast 16 and rotor 17 to the new direction. In exemplary embodiments, the yaw motor is variable speed and will move as quickly as practicable to minimize loss of energy generation.

In exemplary embodiments, when the wind speed increases as described above, the load control system 24 simultaneously adjusts alternator or generator load to optimize rotor rpm and optimize tip-speed ratio. This may comprise relaxing the load on the alternator or generator by reducing the excitation on the magnetic field strength. More particularly, the external excitation 226 of the rotating field coils 38 is adjusted to vary the magnetic flux and control voltage, torque, and ultimately control rotor rpm. Field coil excitation voltage may be adjusted to increase or decrease field strength to increase or decrease flux strength and torque. The load control system 24 may also adjust the hub pitch to optimize tip-speed ratio to the new higher wind speed. It should be noted that, due to the advantageous alternator and generator structures described above, rotation speed of the rotor can be increased without the need for any step-up mechanism. At the moment the new higher speed wind engages the blades 22, 2222 of rotor 17, 2217, the rotor rpm will increase.

In exemplary embodiments, the new rpm information may be sent to the load control system 24, via rpm sensor for example, and the load control system 24 will monitor that data and use it to adjust the pitch and alternator or generator excitation to maintain optimal rotor rpm and tip-speed ratio throughout the speed range of the changing winds. Load control system may also send a signal to the hydrostatic transmission's electronic pressure and flow control to maintain exact rpm of the generator while minimizing parasitic losses in the hydraulic circuit by maximizing system pressure and minimizing gallons per minute flow. In exemplary embodiments, the load control system 24 is programmed to evaluate net output as a function of tip-speed ratio. Thus, it will constantly adjust rotor rpm to optimize tip-speed ratio and generator output 230. The load control system 24 may incorporate "fuzzy logic" which will constantly monitor net energy output and reset field coil excitation to achieve optimized output. The result may be control of rotor rpm through dynamic braking and maintaining optimum tip-speed ratio.

If the wind energy system 10 is connected to a utility grid 242, as seen in FIG. 28, its generated power and its fluctuations can be fed into the grid 242 without a transformer or inverter. As discussed above, some important advantages of disclosed embodiments are their portability and low speed energy generation, which make the wind energy systems ideal for distributed generation, i.e., direct output to a local consumer in stand-alone mode 238. An example of this is community wind, or distributed wind, where small local wind turbines replace or augment utility power through a net meter 47. Power can be provided from the wind energy system directly without grid tie, providing autonomy to individuals and communities at off-grid sites.

If the wind energy system is operating in a stand-alone configuration 238 and load and supply are not perfectly even, then a series of events are automatically initiated. For example, in the event of surplus or uneven power, the wind energy system can store excess energy, or the stored energy can be utilized to make up for low wind output. Exemplary embodiments of wind energy systems can store energy in various ways, including but not limited to, charging one or more batteries to accept excess power when power surges cannot be absorbed by the consumer, producing hydrogen through dissociation of biomass and/or in one or more fuel cells, producing water from humidity in the air, and/or discharging at high rates into capacitors. The end user can stabilize power output by selecting which form of storage to use. If wind power is below demand, the stored power can be used to feed electricity through an inverter or fuel cell back into the output. In the event of low wind, the wind energy system could include a stand-by diesel generator.

It should be noted that a wind energy system in stand-alone configuration is especially susceptible to the problem of excess power output. This problem can be ameliorated through the use of an energy accumulator in various forms. A battery bank is one example. As best seen in FIG. 28, excess power could be stored in a load bank such as a battery bank 41 and returned to the system when wind level is low. Customers that need steady power output have the option to use the battery storage system to absorb the fluctuations inherent in wind energy systems. The power generated can be delivered to the batteries 41 until fully charged, or to a local load center 49 where the customer can use the power without connection to a utility power grid 242. If a local utility power grid is available, the VFD can deliver power thru filters into the grid in a net metering fashion. A meter may be utilized to measure power delivered to the grid, or to measure power used by the customer to charge batteries 41, as shown in FIG. 28, or to measure power to run local loads. When the wind is not blowing, and there is no local grid, the charge stored in the batteries can be utilized to deliver any voltage to the customer thru the VFD. As illustrated in FIG. 28, an optional solar system 39 can be installed to charge the batteries. An optional diesel generator 43 also can be installed to charge batteries, or to provide power direct to customer.

In exemplary embodiments, the overload protection system 25 anticipates and monitors for potential overload conditions. When it detects such a condition, overload protection system 25 manages one or more functions of the wind energy system, including but not limited to, alternator excitation, rotor rpm, rotor pitch, rotor azimuth, and/or lay down. The overload protection system 25 employs many different techniques to adjust the functions of the wind energy system, including but not limited to, negating power, re-directing hydraulic fluid to produce a braking load to stop the rotor from rotating, locating the indexing position, locking the rotor with a solenoid pin, lowering the upper mast, rotating the carousel of the trailer assembly to align the mast and rotor with the storage alignment position on the trailer, locking the carousel with a solenoid pin, rotating the mast 16 to a horizontal position, retracting the mast 16 to a midway travel position, and securing the wind energy system. When wind speeds become acceptable again, the overload protection system 25 will reverse the process and commence energy production again.

In exemplary embodiments, the wind energy system's alternator or generator is a 50 kW model that produces full power at about 30 mph wind speed. Although use of a larger alternator or generator is possible, up to 100 kW for example, the typical maximum output of exemplary embodiments is about 50 kW. If the wind energy system 10 is generating maximum rated power and the wind speed and energy exceed the system's ability to increase output, because wind speeds exceed 30 mph or due to wind gust variability exceeds 50 kW such that the wind machine could be overloaded, then the overload protection system 25 may automatically shut the machine down and lay it down. This could include monitoring generator output and managing generator excitation, rotor rpm, and blade pitch as discussed above.

It may also include initiating a pitch stall 228, i.e., adjust blade pitch and dump energy capture. When wind speed or kW output reaches capacity, the overload protection system 25 sends a command for the blades' pitch to stall. The hydraulic system may engage fluid braking to stop the rotor from spinning. Then the overload protection system 25 locates the indexing position, and locks 232 the rotor with a solenoid pin. As described above, addition steps may be commanded by the overload protection system to move the wind energy system into a stowed position, such as retracting the upper mast, relaxing the guy wires, rotating the lower mast to a horizontal position, and retracting the lower mast. The wind energy system 10 may then remain in the lay-down until the load control system 24 provides a command to return to an operational status.

While disclosed systems, devices, and methods have been described in terms of what are presently considered to be the most practical and optimal embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

Thus, it is seen that wind energy systems, devices and methods are provided. It should be understood that any of the foregoing configurations and specialized components or chemical compounds may be interchangeably used with any of the systems of the preceding embodiments. Although illustrative embodiments are described hereinabove, it will be evident to one skilled in the art that various changes and modifications may be made therein without departing from the disclosure. It is intended in the appended claims to cover all such changes and modifications that fall within the true spirit and scope of the disclosure.

The invention claimed is:

1. A wind energy system comprising:
a nacelle;
a rotor driven alternator housed in the nacelle;
a rotor connected to the alternator, the rotor including a rotor hub and three or more rotor blades, each blade being connected to the rotor hub; and
a load control system in communication with the alternator, the load control system receiving wind data and comparing the wind data to parameters of the wind driving the rotor blades such that the load control system anticipates changes in wind speed and adjusts alternator load to optimize rotor rpm and optimize tip-speed ratio.

2. The wind energy system of claim 1 wherein the load control system adjusts the alternator load by reducing magnetic field strength of the alternator.

3. The wind energy system of claim 1 wherein the load control system includes an overload protection system configured to anticipate and monitor for overload conditions.

4. The wind energy system of claim 3 wherein when the overload protection system detects an overload condition the overload protection system manages alternator excitation, rotor rpm, rotor pitch, rotor azimuth, and/or lay down.

5. The wind energy system of claim 4 wherein the overload protection system manages alternator excitation, rotor rpm, rotor pitch, rotor azimuth, and/or lay down by negating power.

6. The wind energy system of claim 1 further comprising a mast, the nacelle being mounted to the mast.

7. The wind energy system of claim 1 further comprising an anemometer in communication with the load control system.

8. The wind energy system of claim 1 wherein the three or more rotor blades comprise five rotor blades.

9. The wind energy system of claim 1 wherein each rotor blade has a foil shape and is connected to the rotor hub by a full foil attachment mechanism.

10. The wind energy system of claim 1 wherein the alternator is configured to operate at low rpm and to increase rotation speed without a step-up mechanism.

11. A wind energy system comprising:
a nacelle;
a rotor driven alternator housed in the nacelle, the alternator including an enclosure, a hollow central tube, and a rotor housed in the enclosure, the rotor comprising an alternator hub and a plurality of vanes attached to the alternator hub and extending to an outer ring, the alternator incorporating 36-72 magnetic poles and being configured to operate at low rpm;
a rotor hub connected to the alternator;
three or more rotor blades, each blade being connected to the rotor hub; and a load control system in communication with the alternator, the load control system configured to anticipate changes in wind speed and adjust alternator load.

12. The wind energy system of claim 11 wherein the alternator includes one or more field coils.

13. The wind energy system of claim 11 wherein the alternator includes 48 poles.

14. The wind energy system of claim 11 wherein the alternator is configured to operate at about 50-160 rpm.

15. The wind energy system of claim 11 wherein the alternator defines an air gap of about $10/1000$ inches.

16. The wind energy system of claim 11 wherein when wind speed increases the load control system adjusts the alternator load to optimize rotor rpm to maintain a tip-speed ratio in a range of about 7 to about 8.1.

17. A wind energy system comprising:
a nacelle;
a rotor driven alternator housed in the nacelle;
a rotor hub assembly connected to the alternator, the rotor hub assembly including at least one disc defining a plurality of slipper fittings serving as full foil attachment mechanisms;
three or more rotor blades, each blade having a foil shape including a foil-shaped root and being connected to the rotor hub assembly at each foil-shaped root by the full foil attachment mechanisms; and
a load control system in communication with the alternator, the load control system configured to anticipate changes in wind speed and adjust alternator load.

18. The wind energy system of claim 17 wherein each full foil attachment mechanism defines a shape corresponding to the foil shape of each blade.

19. The wind energy system of claim 18 wherein the foil shape extends substantially the entire length of each blade.

20. The wind energy system of claim 17 wherein the three or more rotor blades comprise five rotor blades.

* * * * *